United States Patent
Craft, Jr. et al.

(10) Patent No.: US 11,201,003 B2
(45) Date of Patent: Dec. 14, 2021

(54) PLUG-IN POWER AND DATA CONNECTIVITY MICRO GRIDS FOR INFORMATION AND COMMUNICATION TECHNOLOGY INFRASTRUCTURE AND RELATED METHODS OF DEPLOYING SUCH MICRO GRIDS

(71) Applicant: CommScope Technologies LLC, Hickory, NC (US)

(72) Inventors: Thomas F. Craft, Jr., Murphy, TX (US); Rudy Musschebroeck, Wemmel (BE); Jan Jozef Julia Maria Erreygers, Tielt-Winge (BE); David T. Lambert, Manchester (GB); David J. Mather, Altrincham (GB); David Thomas, Chester (GB); Joshua M. Simer, Chaska, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/992,327

(22) Filed: Aug. 13, 2020

(65) Prior Publication Data

US 2020/0373039 A1    Nov. 26, 2020

Related U.S. Application Data

(63) Continuation of application No. 16/507,483, filed on Jul. 10, 2019, now Pat. No. 10,770,203.
(Continued)

(51) Int. Cl.
*H04L 12/10* (2006.01)
*H01B 9/00* (2006.01)
(Continued)

(52) U.S. Cl.
CPC ........... *H01B 9/005* (2013.01); *G02B 6/4454* (2013.01); *H02J 1/00* (2013.01); *H04L 12/10* (2013.01)

(58) Field of Classification Search
CPC .......... H01B 9/00; H01B 9/003; H01B 9/005; H04L 12/10; H04L 12/12; H02J 1/00; H02J 1/001; G02B 6/4454
See application file for complete search history.

(56) References Cited

U.S. PATENT DOCUMENTS 8,013,466 B1    9/2011  Thompson et al.
9,557,505 B2    1/2017  Huegerich et al.
(Continued)

FOREIGN PATENT DOCUMENTS

| EP | 1986303 | 10/2008 |
|---|---|---|
| EP | 3327732 | 5/2018 |
| WO | 2018/017544 | 1/2018 |

OTHER PUBLICATIONS

Notification of Transmittal of the International Search Report and the Written Opinion of the International Searching Authority, or the Declaration, corresponding to International Application No. PCT/US2019/041913, dated Sep. 1, 2019, 13 pp.

*Primary Examiner* — Siu M Lee
(74) *Attorney, Agent, or Firm* — Myers Bigel, P.A.

(57) ABSTRACT

A power and data connectivity micro grid includes a first power sourcing equipment device having first and second power ports and first and second data ports, and configured to deliver DC power signals to the first and second power ports. The micro grid further includes first and second remote distribution nodes, and first and second splice enclosures, each splice enclosure having a power input port, a data input port, a power tap port, a data tap port, a power output port and a data output port. A first composite power-data cable is coupled between the first power port and the first
(Continued)

data port of the first power sourcing equipment device and the power input port and the data input port of the first splice enclosure. A second composite power-data cable is coupled between the second power port and the second data port of the first power sourcing equipment device and the power input port and the data input port of the second splice enclosure. The power tap port and the data tap port of the first splice enclosure are coupled to a power input port and a data input port of the first remote distribution node, respectively.

20 Claims, 11 Drawing Sheets

Related U.S. Application Data

(60) Provisional application No. 62/700,350, filed on Jul. 19, 2018.

(51) Int. Cl.
*G02B 6/44* (2006.01)
*H02J 1/00* (2006.01)

(56) References Cited

U.S. PATENT DOCUMENTS

| | | | |
|---|---|---|---|
| 9,893,811 | B2 | 2/2018 | Chappell et al. |
| 9,977,208 | B2 | 5/2018 | Huegerich et al. |
| 10,770,203 | B2 * | 9/2020 | Craft, Jr. ............... G02B 6/4454 |
| 2007/0081553 | A1 | 4/2007 | Cicchetti et al. |
| 2010/0037093 | A1 | 2/2010 | Biederman et al. |
| 2014/0293994 | A1 | 10/2014 | Pepe et al. |
| 2015/0309271 | A1 | 10/2015 | Huegerich et al. |
| 2019/0089467 | A1 | 3/2019 | Goergen et al. |
| 2019/0280895 | A1 * | 9/2019 | Mather .................. H04L 41/12 |
| 2019/0342011 | A1 | 11/2019 | Goergen et al. |

* cited by examiner

PLUG-IN POWER AND DATA CONNECTIVITY MICRO GRIDS FOR INFORMATION AND COMMUNICATION TECHNOLOGY INFRASTRUCTURE AND RELATED METHODS OF DEPLOYING SUCH MICRO GRIDS

CROSS-REFERENCE TO RELATED APPLICATION

The present application claims priority under 35 U.S.C. § 120 as a continuation of U.S. patent application Ser. No. 16/507,483, filed, Jul. 10, 2019, which in turn claims priority under 35 U.S.C. § 119 to U.S. Provisional Patent Application Ser. No. 62/700,350, filed Jul. 19, 2018, the entire content of each of which is incorporated herein by reference.

FIELD

The present invention relates to information and communication technology systems and, more particularly, to providing electric power and data connectivity to remote devices in such systems.

BACKGROUND

In many information and communication technology systems, network-connected electronic devices are deployed in locations where a local electric power source is not available. With the proliferation of the Internet of Things ("IoT"), autonomous driving, fifth generation ("5G") cellular service and the like, it is anticipated that network-connected electronic devices will be deployed at locations that lack a conventional electric power source with increasing frequency.

There are a number of ways to provide electric power to such remote network-connected electronic devices. For example, the local electric utility company can install a connection to the electric power grid. This approach, however, is typically both expensive and time-consuming, and unsuitable for many applications. Composite power-data cables can also be used to power remote network-connected electronic devices and provide data connectivity thereto over a single cabling connection. Composite power-data cables refer to cables that can transmit both electrical power and data. Power-over Ethernet ("PoE") cables are one type of composite power-data cable. However, PoE technology has limitations in terms of both data communication throughput and the amount of power delivered, and these limitations become more restrictive the greater the distance between the remote network-connected electronic device and the PoE source. For example, under current PoE standards, high throughput data communications is only supported for cable lengths of up to about 100 meters, and even at these short distances the power delivery capacity is only about 100 Watts. Power-plus fiber cables are another example of a type of composite power-data cable that includes both power conductors and optical fibers within a common cable jacket. Power-plus-fiber cables, however, can be prohibitively expensive to install for many applications. Other known types of composite power-data cables include coaxial cables, telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission.

SUMMARY

Pursuant to embodiments of the present invention, power and data connectivity micro grids are provided that include a local power supply, a first power sourcing equipment device, first and second remote distribution nodes, first and second splice enclosures, and first and second composite power-data cables. The first power sourcing equipment device has a first power port, a second power port, a first data port and a second data port, and is coupled to the local power supply and configured to deliver respective DC power signals to the first power port and the second power port. The first and second splice enclosures each have a power input port, a data input port, a power tap port, a data tap port, a power output port and a data output port. The first composite power-data cable is coupled between the first power port and the first data port of the first power sourcing equipment device and the power input port and the data input port of the first splice enclosure and the second composite power-data cable is coupled between the second power port and the second data port of the first power sourcing equipment device and the power input port and the data input port of the second splice enclosure. The power tap port and the data tap port of the first splice enclosure are coupled to a power input port and a data input port of the first remote distribution node, respectively.

In some embodiments, the power and data connectivity micro grid may further include a third splice enclosure coupled along the first composite power-data cable between the first splice enclosure and the first power sourcing equipment device. In such embodiments, the power input port and the data input port of the third splice enclosure may be coupled to the first power port and the first data port of the first power sourcing equipment device via a segment of the first composite power-data cable, and the power output port and the data output port of the third splice enclosure may be coupled to the power input port and the data input port of the first splice enclosure, respectively.

In some embodiments, the power and data connectivity micro grid may further include a second power sourcing equipment device having a third power port and a third data port, the second power sourcing equipment device configured to deliver a DC power signal to the third power port. In such embodiments, the power and data connectivity micro grid may also include a third composite power-data cable coupled between the third power port and the third data port of the second power sourcing equipment device and the power output port and the data output port of the first splice enclosure.

In some embodiments, the power and data connectivity micro grid may further include a first remote powered device that is coupled to a local power port and a local data port of the first remote distribution node. The first remote powered device may be coupled to the local power port and the local data port of the first remote distribution node via, for example, a composite power-data cable such as a power over Ethernet cable.

In some embodiments, less than all of the optical fibers included in the first composite power-data cable may be coupled to the first remote distribution node.

In some embodiments, the first composite power-data cable may comprise a power-plus-fiber cable that includes a plurality of segments, where each segment includes a plurality of optical fibers and a plurality of pairs of power conductors, and where some of the segments include more optical fibers than other of the segments. Similarly, some of the segments may include more pairs of power conductors than other of the segments.

In some embodiments, the power tap port and the data tap port of the second splice enclosure may be coupled to a power input port and a data input port of the second remote distribution node, respectively.

In some embodiments, the power and data connectivity micro grid may further include a fourth splice enclosure coupled along the second composite power-data cable between the first power sourcing equipment device and the second remote distribution node. In some embodiments, the power and data connectivity micro grid further includes a third composite power-data cable that extends adjacent the second composite power-data cable between the first power sourcing equipment device and a fifth splice enclosure.

In some embodiments, the power and data connectivity micro grid may further include a sixth splice enclosure coupled to a third power port and a third data port of the first power sourcing equipment device via a fourth composite power-data cable, the sixth splice enclosure including a power input port and a data input port that are coupled to the third power port and the third data port of the first power sourcing equipment device, respectively, a power output port and a data output port, a first power tap port and a first data tap port that are coupled to a third remote distribution node and a second power tap port and a second data tap port that are coupled to a fourth remote distribution node.

In some embodiments, the power and data connectivity micro grid may further include a seventh splice enclosure coupled between the third power port and the third data port of the first power sourcing equipment device and the sixth splice enclosure.

In some embodiments, the first composite power-data cable may include both power conductors and optical fibers.

In some embodiments, the first remote distribution node may be configured to step down a voltage of a DC power signal received at the power input port of the first remote distribution node and to output a lower voltage DC power signal through a local power port of the first remote distribution node.

In some embodiments, respective voltage levels of the DC power signals output at the first power port and the second power port of the first power sourcing equipment device may each exceed 260 volts.

In some embodiments, the first remote powered device and the first remote distribution node may be mounted on the same elevated structure.

In some embodiments, the first power port and the first data port of the first power sourcing equipment device may be implemented together as a first hybrid power-data port, the second power port and the second data port of the first power sourcing equipment device may be implemented together as a second hybrid power-data port, and the power input port and the data input port of the first splice enclosure may comprise a hybrid power-data input port, the power tap port and the data tap port of the first splice enclosure may comprise a hybrid power-data tap port, and the power output port and the data output port of the first splice enclosure may comprise a hybrid power-data output port.

In some embodiments, the first remote distribution node may include an associated energy storage device and may further include a bi-directional DC-to-DC converter that is configured to pass DC power from the energy storage device to the first splice enclosure in response to power being lost at the first power sourcing equipment device.

In some embodiments, the first remote distribution node may include an associated energy storage device and a DC-to-DC converter that is configured to charge the energy storage device if the energy storage device is not fully charged and the first remote powered device is drawing less than the full rated power of the DC-to-DC converter.

Pursuant to further embodiments of the present invention, power and data connectivity micro grids are provided that include a local power supply, a first power sourcing equipment device that has a first power port, the first power sourcing equipment device coupled to the local power supply and configured to deliver a DC power signal to the first power port, a first composite power-data cable that is coupled between the first power port and a first data port of the first power sourcing equipment device and a first node, a first remote powered device coupled to the first node, a second power sourcing equipment device that is remote from the first power sourcing equipment device and that is configured to deliver a DC power signal to at least a first power port of the second power sourcing equipment device, and a second composite power-data cable that is coupled between the first power port and a first data port of the second power sourcing equipment device and the first node.

In some embodiments, the first node comprises a first splice enclosure, and the power and data connectivity micro grid further includes a first remote distribution node coupled between the first splice enclosure and the first remote powered device. In some embodiments, the power and data connectivity micro grid may further include a second splice enclosure coupled along the first composite power-data cable, the second splice enclosure including a power input port and a data input port that are coupled to the first power port and the first data port of the first power sourcing equipment device, respectively, a power output port and a data output port that are coupled to a power input port and a data input port of the first splice enclosure, and a power tap port and a data tap port.

In some embodiments, the first node may be a first remote distribution node that includes a local power port that is configured to deliver a DC power signal to the first remote powered device.

Pursuant to further embodiments of the present invention, methods of providing power and data connectivity to a remote powered device are provided in which a power and data connectivity micro grid is deployed that delivers DC power to a plurality of components of a telecommunications system. The power and data connectivity micro grid includes a first power sourcing equipment device having a first power port, a second power port, a first data port and a second data port, the first power sourcing equipment device coupled to a local power supply and configured to deliver respective first and second DC power signals having respective first and second DC voltage levels to the first power port and the second power port. The power and data connectivity micro grid further includes a first remote distribution node, a second remote distribution node, a first composite power-data cable that is coupled between the first power port and the first data port of the first power sourcing equipment device and a first power port and a first data port of the first remote distribution node and a second composite power-data cable that is coupled between the second power port and the second data port of the first power sourcing equipment device and a first power port and a first data port of the second remote distribution node, and a first splice enclosure that is coupled along the first hybrid power-data cable between the first power sourcing equipment device and the first remote distribution node. The method further comprises connecting a third composite power-data cable to a power tap port of the first splice enclosure, connecting a third remote distribution node to the third composite power-data cable, connecting a first remote powered device to the third remote distribution node, and providing a third DC power signal having a third DC voltage level that is less than the first DC voltage level to the first remote powered device over a portion of the first composite power-data cable and over at least a portion of the third composite power-data cable.

In some embodiments, the first DC voltage level exceeds 260 volts.

In some embodiments, the micro grid power and data connectivity system further includes a second power sourcing equipment device that is coupled to the first remote distribution node via a fourth composite power-data cable.

In some embodiments, the method further comprises providing a data signal to the first remote powered device over a portion of the first composite power-data cable and over at least a portion of the third composite power-data cable.

DETAILED DESCRIPTION

Figure 1:
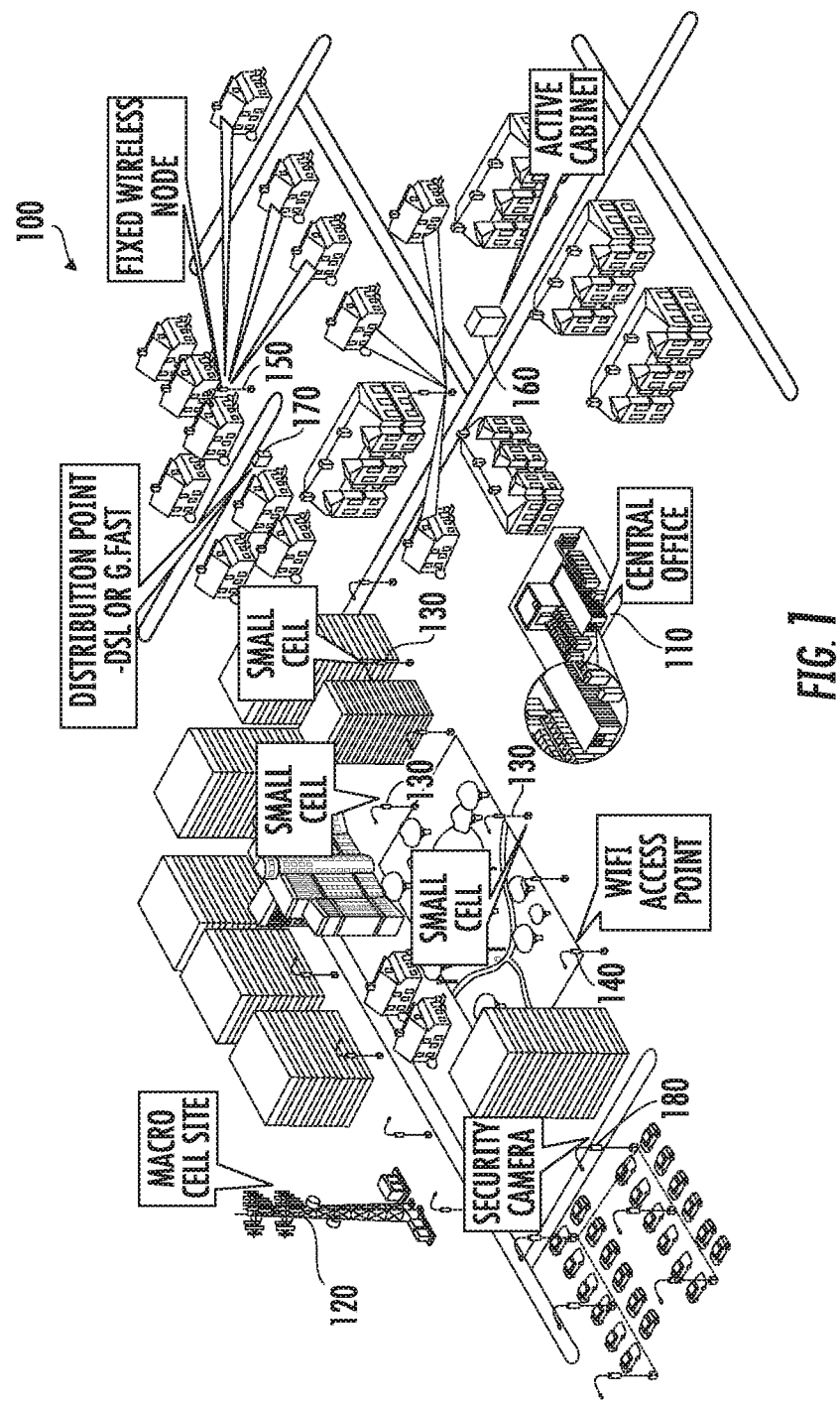
FIG. 1 is a schematic diagram illustrating the increasing power and data connectivity needs for information and communication technology infrastructure in high density access networks.

Cellular data traffic has increased by about 4,000 percent over the last decade, and is expected to continue increasing at a rate of over 50% per year for at least the next several years. Cellular operators are beginning to deploy 5G cellular networks in an effort to support the increased cellular data traffic with better coverage and reduced latency. One expected change in the cellular architecture that is anticipated with the deployment of 5G networks is a rapid increase in the number of so-called small cell base stations that are deployed. Generally speaking, a "small cell" base station refers to an operator-controlled, low-power radio access node that operates in the licensed spectrum and/or that operates in the unlicensed spectrum but provides operator-grade WiFi connectivity. The term "small cell" encompasses microcells, picocells, femtocells and metrocells that support communications with fixed and mobile subscribers that are within between about 10 meters and 300-500 meters of the small cell base station depending on the type of small cell used. The term small cell generally does not encompass in-building solutions such as distributed antenna systems that are typically implemented as part of the macrocell layer of a cellular network.

Small cell base stations are typically deployed within the coverage area of a base station of the macrocell network, and the small cell base stations are used to provide increased throughput in high traffic areas within the macrocell. This approach allows the macrocell base station to be used to provide coverage over a wide area, with the small cell base stations supporting much of the capacity requirements in high traffic areas within the macrocell. In heavily-populated urban and suburban areas, it is anticipated that more than ten small cells will be deployed within a typical 5G macrocell in order to support the increased throughput requirements. As small cell base stations have limited range, they must be located in close proximity to users, which typically requires that the small cell base stations be located outdoors, often on publicly-owned land such as along streets. Typical outdoor locations for small cell base stations include lamp posts, utility poles, street signs and the like, which are locations that either do not include an electric power source, or include a power source that is owned and operated by an entity other than the cellular network operator. A typical small cell base station may require between 200-1,000 Watts of power. As small cell base stations are deployed in large numbers, providing electric power to the small cell base station locations represents a significant challenge.

When deploying a new macrocell base station, a cellular operator will typically work with the local electric utility company to arrange to have alternating current ("AC") power provided to the site from the local electric power grid. While this process may be both time-consuming and expensive, the time required to plan, build and deploy a new macrocell base station may be as long as two years, allowing sufficient time for coordinating with the electric utility company, obtaining necessary permitting from local government agencies, and then having the local electric utility company deploy the connection to the electric power grid in order to deliver power to the site. Moreover, the cost associated with providing power to the macrocell base station, which may be on the order of $5,000 to $20,000, can readily be absorbed by a macrocell base station that serves thousands of users. Thus providing electric power to macrocell base stations has not raised major issues for cellular network operators. Unfortunately, however, the model for delivering electric power to macrocell base stations does not work well with small cell deployments, where the cellular network operator typically needs to deploy small cell base stations quickly and in a cost-effective manner. In order to meet these goals, cellular operators require a repeatable process for delivering electric power to small cell base station locations that preferably does not require involvement of third parties such as electric utility companies.

One solution that has been proposed for powering small cell base stations is the use of the above-mentioned composite power-data cables. Composite power-data cables allow a cellular network operator to deploy a single cable between a hub and a small cell base station that provides both electric power and backhaul connectivity to the small cell base station. The hub may be, for example, a central office, a macro cell base station or some other network operator owned site that is connected to the electric power grid. All cellular base stations must have some sort of backhaul connection to the core network, and with small cell base stations the backhaul connection is typically implemented as a fiber optic cabling connection. Since the cellular network operator already would typically deploy a fiber optic cable to a new small cell base station installation, changing the fiber optic cable to a power-plus-fiber cable provides a relatively low cost solution for also providing an electric power connection to the new small cell base station, particularly as the installation costs associated with installing a new cabling connection between a hub and the new small cell base station will typically exceed, and often far exceed, the additional cost associated with adding power conductors to the fiber optic cable. For example, the incremental cost of deploying (installing) a power-plus-fiber cable as compared to deploying a fiber optic cable is less than $1/foot, while the cost of deploying cables in the outside plant are on the order of $1.5/foot to $6/foot in typical installations. Moreover, in urban areas—which is one of the most common locations where new small cell base stations are being deployed—the cables often must be installed underground beneath concrete or asphalt surfaces. In such environments, the installation costs can be as high as $30-40/foot or even more.

While using composite power-data cables may be an improvement over more conventional solutions for powering small cell base stations and other remote network-connected devices, deploying long composite power-data cables can be expensive and time-consuming, and hence may not be a completely satisfactory solution. As such, new techniques for providing backhaul and power connectivity to 5G small cell base stations and other remote network-connected device are needed.

Pursuant to embodiments of the present invention, power and data connectivity micro grids are provided for information and communication technology infrastructure including small cell base stations. These power and data connectivity micro grids may be owned and controlled by cellular network operators which allows the cellular network operators to more quickly and less expensively provide power and data connectivity (backhaul) to new small cell base stations. The power and data connectivity micro grids according to embodiments of the present invention may be cost-effectively deployed by over-provisioning the power sourcing equipment and cables that are installed to provide power and data connectivity to new installations such as new small cell base station installations.

The power and data connectivity micro grids according to embodiments of the present invention may include a network of composite power-data cables that are used to distribute electric power and data connectivity throughout a defined region. These micro grids may be deployed in high density areas, which is where most 5G small cell base stations will need to be deployed. Each micro grid may include a network of composite power-data cables that extend throughout a geographic area. The network of composite power-data cables (and the sourcing equipment supplying the network of composite power-data cables with power and data capacity) may be designed to have power and data capacity far exceeding the capacity requirements of existing nodes along the micro grid. Because such excess capacity is provided, when new remote network-connected devices are installed in the vicinity of a micro grid, composite power-data cables can be routed from tap points along the micro grid to the location of the new remote network-connected device (e.g., a new small cell base station). The newly installed composite power-data cables may themselves be over-provisioned and additional tap points may be provided along the new composite power-data cabling connections so that each new installation may act to further extend the footprint of the micro grid. In this fashion, cellular network operators may incrementally establish their own power and data connectivity micro grids throughout high density areas, which means that when new small cell base stations, WiFi access points or other remote powered devices are deployed, they will often be in close proximity to at least one tap point along the micro grid. In many cases, the only additional cabling that will be required to power such new base stations is a relatively short composite power-data cable that connects the new small cell base station to an existing tap point of the micro grid. Moreover, by over-provisioning some or all of the newly-installed composite power-data cables, the micro grids according to embodiments of the present invention may naturally grow throughout high density areas allowing network operators to quickly and inexpensively add new infrastructure to their networks. In some embodiments, the composite power-data cables may be implemented as power-plus-fiber cables, as such cables have significant power and data transmission capacity. However, other composite power-data cables (e.g., coaxial cables) may additionally and/or alternatively be used.

In some embodiments, the power delivery component of the power and data connectivity micro grids may comprise a low voltage, direct current ("DC") power grid. In some embodiments, the DC power signals that are distributed over the micro grid may have a voltage that is higher than the (AC) voltages used in most electric utility power distribution systems (e.g., 110 V or 220 V AC), which may help reduce power loss, but the voltage may be lower than 1500 V DC so as to qualify as a low voltage DC voltage under current standards promulgated by the International Electrotechnical Commission (IEC). For example, the micro grid may carry a 380 V DC power signal (or some other DC voltage greater than 48-60 V and less than 1500 V) in some embodiments. Tap points may be installed along the composite power-data cables. In some embodiments, the tap points may comprise intelligent remote distribution nodes that include a gated pass-through power bus that allows for daisy chain operation and/or splitting of the power signal, as well as one or more local ports that may be used to power remote powered devices that are co-located with the intelligent remote distribution node or in close proximity thereto. When a new composite power-data cable is installed, one or more unused intelligent remote distribution nodes may be pre-installed along the composite power-data cable to serve as tap points for information and communication infrastructure that is deployed in the future. In other embodiments, the tap points may comprise splice enclosures that are installed along the composite power-data cables. These splice enclosures may be similar to conventional fiber optic splice enclosures and may include terminations for both the optical fibers and power conductors of the composite power-data cables. The splice enclosures may provide connection points for "branch" composite power-data cables that supply power and data connectivity to existing installations that are connected to the micro grid, may include a gated pass-through power bus, and/or may act as tap points for future installations.

In some instances, multiple composite power-data cables may be deployed that run in parallel between power and data connectivity source equipment and splice enclosures and/or intelligent remote distribution nodes in order to pre-install additional power and data capacity that can be tapped into later to support future installations. In this fashion, power and data connectivity may be deployed to new installations while at the same time building out a highly over-provisioned micro grid of power and data connectivity resources that may be used to economically provide power and data connectivity to future installations. Such an approach has the potential to significantly reduce the costs of providing power and data connectivity to newly deployed equipment while also significantly reducing the time required to provide such power and data to a new installation. In still other embodiments, additional power sourcing equipment devices may be installed as the micro grid grows, and in some cases power and data may be fed to splice enclosures and/or intelligent remote distribution nodes from multiple power sourcing equipment devices. This may increase the number of remote powered devices that may be supported by the micro grid and may provide redundancy in the event of a fault at one of power sourcing equipment devices.

Aspects of the present invention will now be discussed in greater detail with reference to the figures, which illustrate example embodiments of the power and data connectivity micro grids according to embodiments of the present invention.

FIG. 1 is a schematic diagram illustrating the increasing power and data connectivity needs for information and communication technology infrastructure in high density access networks. As shown in FIG. 1, in an urban or suburban environment 100, a telecommunications provider such as a cellular network operator may operate a central office 110 and a macro cell base station 120. In addition, the telecommunications provider may operate a plurality of small cell base stations 130, WiFi access points 140, fixed wireless nodes 150, active cabinets 160, DSL distribution points 170, security cameras 180 and the like. All of these installations may require DC power to operate active equipment, and most, if not all, of these installations may also require data connectivity either for backhaul connections to the central office and/or for control or monitoring purposes. As described above, it may be both expensive and time consuming to provide local power sources for these installations.

In order to reduce costs and increase the speed at which electric power and data connectivity can be deployed to remote network-connected powered devices such as the remote devices 130, 140, 150, 160, 170, 180 illustrated in FIG. 1, the use of power-plus-fiber cables has been proposed as a cost-effective solution for providing power and data connectivity to remote devices. For example, PCT Publication No. WO 2018/017544 A1 discloses an approach for providing power and data connectivity to a series of remote powered devices in which power-plus-fiber cables extend from a power source to a plurality of intelligent remote distribution nodes. Each intelligent remote distribution node may include a "pass-through" port so that a plurality of remote distribution nodes may be coupled to the power source in "daisy chain" fashion. Intelligent remote powered devices may be connected to each intelligent remote distribution node and may receive power and data connectivity from the intelligent remote distribution node.

One drawback of the approach disclosed in PCT Publication No. WO 2018/017544 A1 is that as new installations are deployed, it is necessary to install another power-plus-fiber cable that runs from the power source to the new installation. Deploying such power-plus-fiber cables can be time consuming and expensive, particularly in urban environments.

Pursuant to embodiments of the present invention, the power source equipment and remote distribution node approach disclosed in PCT Publication No. WO 2018/017544 A1 may be extended so that cellular network operators may create a hard wired power and data connectivity micro grid throughout high density urban and suburban areas. As new installations (e.g., new small cell base stations, security cameras and the like) are deployed in such areas, the cellular network operator may simply tap into a nearby portion of the micro grid to obtain power and data connectivity without any need to run cabling connections all the way from the power and data source equipment to the new installation. The micro grids according to embodiments of the present invention may be viewed as being akin to the backplane on a computer, as the micro grids extend throughout the area in which power and data connectivity are required and have excess power and data connectivity resources available so that new installations may simply "plug into" the micro grid at any of a large number of tap points.

Figure 2:
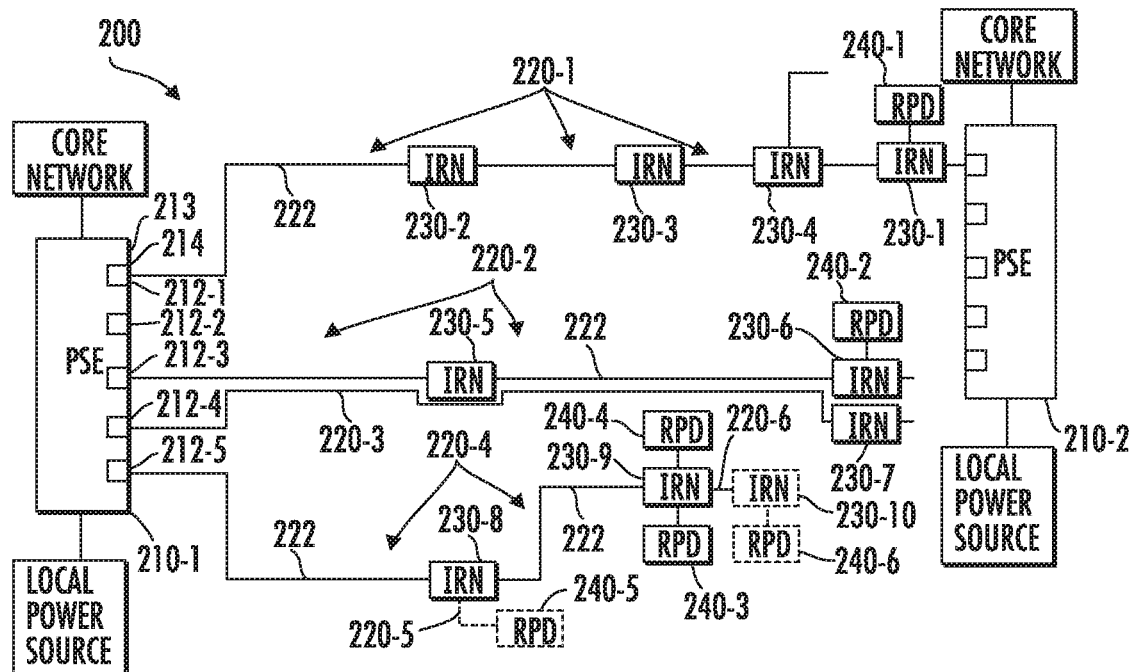
FIG. 2 is a schematic diagram illustrating a power and data connectivity micro grid according to embodiments of the present invention.

FIG. 2 is a schematic diagram illustrating a power and data connectivity micro grid 200 according to embodiments of the present invention. As shown in FIG. 2, a power sourcing equipment ("PSE") device 210-1 may be provided that acts as an injection point for both power and data into the power and data connectivity micro grid 200. Each power sourcing equipment device 210 may include a plurality of power ports 213 and data ports 214. The power ports 213 and the data ports 214 will typically be implemented as power and data connectors, respectively, but other implementations are possible. For example, the power ports 213 and/or the data ports 214 could be implemented as openings in a housing of the power sourcing equipment device 210 that are configured to receive the power and/or data cables 213, 214. In some embodiments, a power port 213 and a data port 214 may be implemented together as a hybrid power-data port 212 that includes one or more power ports 213 and one or more data ports 214 that are implemented using, for example, a single hybrid connector. In other embodiments, the power ports 213 and the data ports 214 may be implemented separately (e.g., as separate connectors). In the description that follows, it will be assumed that the power ports 213 and the data ports 214 are implemented using hybrid power-data ports 212 for convenience, but it will be appreciated that any or all of the hybrid power-data ports 212 may be replaced with separate power ports 213 and the data ports 214 in other embodiments. Accordingly, it will be understood that herein all references to hybrid power-data ports may be replaced with references to separate power and data ports. Moreover, in some cases the data ports may be omitted.

Composite power-data cables 220 may be connected to each hybrid power-data port 212 to extend the micro grid 200 across a geographic region. Each composite power-data cable 220 may comprise, for example, a single cable that includes both power conductors and optical fibers, one or more power cables and one or more fiber optic cables that are contained together within a common jacket, one or more power cables and one or more fiber optic cables that are coupled together (e.g., by a helical wrap) or any other cable or combination of cables that include both power conductors and a separate data transmission medium that may be used to carry both DC power as well as data. Coaxial cables are another type of composite power-data cable 220 that can be used in some embodiments of the present invention. Additional composite power-data cables include telephone twisted pair cables with remote power feeding on some pairs and direct subscriber line (DSL) data on other pairs or with both power and DSL on the same pairs, and composite cables having larger conductors (e.g., 10-12 AWG) for power transmission and smaller gauge twisted pairs for data transmission. The composite power-data cables 220 will typically be connectorized. In some embodiments, ends of the composite power-data cables 220 may include fanouts of electrical conductors and optical fibers (which may comprise single conductors/fibers or groups thereof) that are individually connectorized. In other embodiments, the composite power-data cables 220 may be connectorized using one or more hybrid power-data connectors. When coaxial cables are used to implement the composite power-data cables, the same conductors carry both the power and data signals and suitable mechanisms may be used to inject and extract the data communication signals.

Initially, only a single power sourcing equipment device 210-1 may be provided, and then additional power sourcing equipment devices 210 may be added as the micro grid 200 is expanded. One such additional power sourcing equipment device 210-2 is shown with dotted lines in FIG. 2. Each power sourcing equipment device 210 may be configured to output DC power through each hybrid power-data port 212 and to transmit and receive data through each hybrid power-data port 212. It should be noted that like elements may be designated with the same reference numeral in this specification and in the accompanying drawings. In some case, such like elements may be assigned two part reference numerals so that the elements may be referred to individually by their full reference numerals (e.g., power sourcing equipment device 210-2) or referred to collectively by the first part of their reference numeral (e.g., the power sourcing equipment devices 210).

A plurality of composite power-data cables 220 are connected to the respective hybrid power-data ports 212 of the power sourcing equipment device 210. As noted above, the composite power-data cables 220 may be implemented using power-plus-fiber cables in some embodiments. For ease of description, in the discussion that follows, the composite power-data cables 220 will be described as being power-plus-fiber cables 220. It will be appreciated, however, that other types of composite power-data cables 220 may be used and that appropriate modifications may be made to the equipment attached to the cables.

Referring again to FIG. 2, each power-plus-fiber cable 220 may include a plurality of discrete cable segments 222. Each cable segment 222 may be connectorized with, for example, a fanout of individual power connectors and data connectors or with one or more hybrid power-data connectors. Each cable segment 222 may include a plurality of optical fibers and at least a pair of electrical conductors (e.g., 12 AWG or 16 AWG copper conductors). While typically both the optical fibers and the power conductors will be contained within a common protective jacket, in some embodiments, the power-plus-fiber cables 220 may be implemented as separate fiber optic and power cable that are co-installed with each other (e.g., routed through the same conduit).

As is further shown in FIG. 2, a plurality of intelligent remote distribution nodes ("IRN") 230 may be installed along each power-plus-fiber cable 220. Remote powered devices ("RPD") 240 such as small cell base stations, WiFi access points, fixed wireless nodes, active cabinets, DSL distribution points, security cameras and the like may be connected to respective ones of the intelligent remote distribution nodes 230. In some cases, a single remote powered device 240 may be connected to an intelligent remote distribution nodes 230, while in other cases multiple remote powered devices 240 may be connected to the same intelligent remote distribution node 230.

When a new remote powered device 240 is being added to the network, the network operator may install a power-plus-fiber cable 220 that connects the new remote powered device 240 to a hybrid power-data port 212 on the power sourcing equipment device 210. For example, with reference to FIG. 2, the new remote powered device 240 may be the remote powered device 240-1. As shown in FIG. 2, a power-plus-fiber cable 220-1 may be installed that connects hybrid power-data port 212-1 on power sourcing equipment device 210-1 to an intelligent remote distribution node 230-1. The power-plus-fiber cable 220-1 may be purposefully over-provisioned to include excess power and data carrying capacity. For example, the power-plus-fiber cable 220-1 may include twelve, twenty-four, forty-eight or more optical fibers even though the new remote powered device 240-1 may only require one or two optical fibers for data connectivity. Likewise, the power-plus-fiber cable 220-1 may include a plurality of pairs of power conductors that are capable of transmitting significantly more power than is required by the new remote powered device 240-1. In addition, one or more additional intelligent remote distribution nodes 230-2, 230-3, 230-4 may be pre-installed along the power-plus-fiber cable 220-1, thereby dividing the power-plus-fiber cable 220-1 into a plurality of cable segments 222. The intelligent remote distribution nodes 230-2, 230-3, 230-4 may serve as tap points where additional power-plus-fiber cables 220 may be added to the micro grid 200 to provide power and data connectivity to other installations in the future.

As is further shown in FIG. 2, when another remote powered device 240-2 is added to the network, a pair of power-plus-fiber cables 220-2, 220-3 may be co-installed at the same time. Power-plus-fiber cable 220-2 may extend between another hybrid power-data port 212-3 on power sourcing equipment device 210-1 to an intelligent remote distribution node 230-6. The power-plus-fiber cable 220-2 may again be purposefully over-provisioned to include excess power and data carrying capacity, and may also have one or more additional intelligent remote distribution nodes (here node 230-5) pre-installed as a future tap point between the hybrid power-data port 212-3 and the intelligent remote distribution node 230-6. In addition, a second power-plus-fiber cable 220-3 may be installed at the same time as power-plus-fiber cable 220-2, even though the second power-plus-fiber cable 220-3 is not needed to support the remote powered device 240-2. Power-plus-fiber cables 220-2, 220-3 may be installed directly next to each other in, for example, the underground and/or aerial outside plant so that the incremental installation cost for deploying the additional power-plus-fiber cable 220-3 may be kept low. The additional power-plus-fiber cable 220-3 may have an intelligent remote distribution node 230-7 installed at the distal end thereof that may serve as a tap point for future additional power-plus-fiber cables 220. The intelligent remote distribution node 230-7 may be at a relatively large distance from the power sourcing equipment device 210. By pre-installing power-plus-fiber cable 220-3 at the time power-plus-fiber cable 220-2 is deployed, the need to later install power-plus-fiber cables 220 that extend all the way back to the power sourcing equipment device 210-1 may be avoided, because when new remote powered devices 240 are installed in the general vicinity of the remote powered device 240-2, the pre-installed power-plus-fiber cable 220-3 may be used to provide power and data connectivity to such newly-installed devices 240 through short power-plus-fiber connections to the intelligent remote distribution node 230-7.

As will be discussed in greater detail herein, each pre-installed intelligent remote distribution node 230 may have low voltage and/or high voltage ports. As noted above, the power sourcing equipment device 210 may output a low voltage DC power signals (e.g., 380 V or some other voltage less than 1500 V DC) onto the power-plus-fiber cables 220. Since the low voltage DC power signal may be significantly higher than the DC voltages (e.g., 46-60 V DC) used to power most information and telecommunications infrastructure equipment, the power loss along the power-plus-fiber cables 220 may be reduced and/or the power carrying capacity of the hybrid power-plus-fiber cables 220 may be increased. As will be explained in greater detail below, each intelligent remote distribution node 230 may include a pass-through power bus that passes DC power that is received over a first power-plus-fiber cable segment 222 at an input port of the intelligent remote distribution node 230 to a second power-plus-fiber cable segment 222 that is connected to an output port of the intelligent remote distribution node 230. Each intelligent remote distribution node 230 may further include a local power bus that taps a portion of the DC power signal from the pass-through power bus. Each intelligent remote distribution node 230 may also include step-down equipment such as a buck converter that reduces the voltage level of the tapped DC power signal to a level that is suitable for powering the remote powered devices 240 (e.g., 48-64 V DC). The pass-through power bus may facilitate "daisy-chaining" multiple intelligent remote distribution nodes 230 along a single power-plus-fiber cable 220 to support remote powered devices 240 at a plurality of locations. By providing intelligent remote distribution nodes 230 that have pass through power buses with multiple outputs, new branches may be deployed from an existing intelligent remote distribution node 230 that extend in new directions to power remote powered devices 240.

Once the micro grid 200 has been partially deployed, the expense associated with adding additional remote powered devices 240 may be reduced. For example, as shown in FIG. 2, the cellular network operator may initially install a power-plus-fiber cable 220-4 that is used to power a pair of remote powered devices 240-3, 240-4 via the local ports of an intelligent remote distribution node 230-9. When the power-plus-fiber cable 220-4 and the intelligent remote distribution node 230-9 were installed, the power-plus-fiber cable 220-4 was over-provisioned with significant excess power and data-carrying capacity, and an unused intelligent remote distribution node 230-8 was installed along the power-plus-fiber cable 240-4 between the power sourcing equipment device 210-1 and the intelligent remote distribution node 230-9. Thereafter, the cellular network operator may need to install additional remote powered devices 240 such as remote powered device 240-5 and/or remote powered device 240-6. A power-plus-fiber cable 220-5 (or other composite power-data cable) may be installed between the remoted powered device 240-5 and the intelligent remote distribution node 230-8 to provide power and data connectivity to the remote powered device 240-5. In many cases, the remote powered device 240-5 may be much closer to the intelligent remote distribution node 230-8 than it is to the power sourcing equipment device 210-1. As such, significant savings may be achieved since the cellular network operator can install a relatively short power-plus-fiber cable 220-5 to connect the remote powered device 240-5 to the micro grid 200. Remote powered device 240-6 may similarly be connected to the micro grid 200 by installing another intelligent remote distribution node 230-10 and connecting a power-plus-fiber cable 220-6 between intelligent remote distribution nodes 230-9 and 230-10. The installation of intelligent remote distribution node 230-10 also advantageously serves to further expand the power and data connectivity micro grid 200 throughout the geographic region, which may help further reduce the cost of installing additional remote powered devices 240 in the future.

As is further shown in FIG. 2, additional power sourcing equipment devices 210 such as power sourcing equipment device 210-2 may be added to the micro grid 200 over time. In some embodiments, the power sourcing equipment devices 210-1, 210-2 may be located in geographically diverse locations to reduce power losses over the power-plus-fiber cabling connections 220. In addition, the second power sourcing equipment device 210-2 may be connected to some of the same intelligent remote distribution nodes 230 as is power sourcing equipment device 210-1. As a result, the remote powered devices 240 along such power-plus-fiber cables 220 may be powered by either power sourcing equipment device 210. This arrangement provides redundancy in case there is a failure at one of the power sourcing equipment devices 210 and/or one of the power-plus-fiber cables 220 is damaged.

Figure 3:
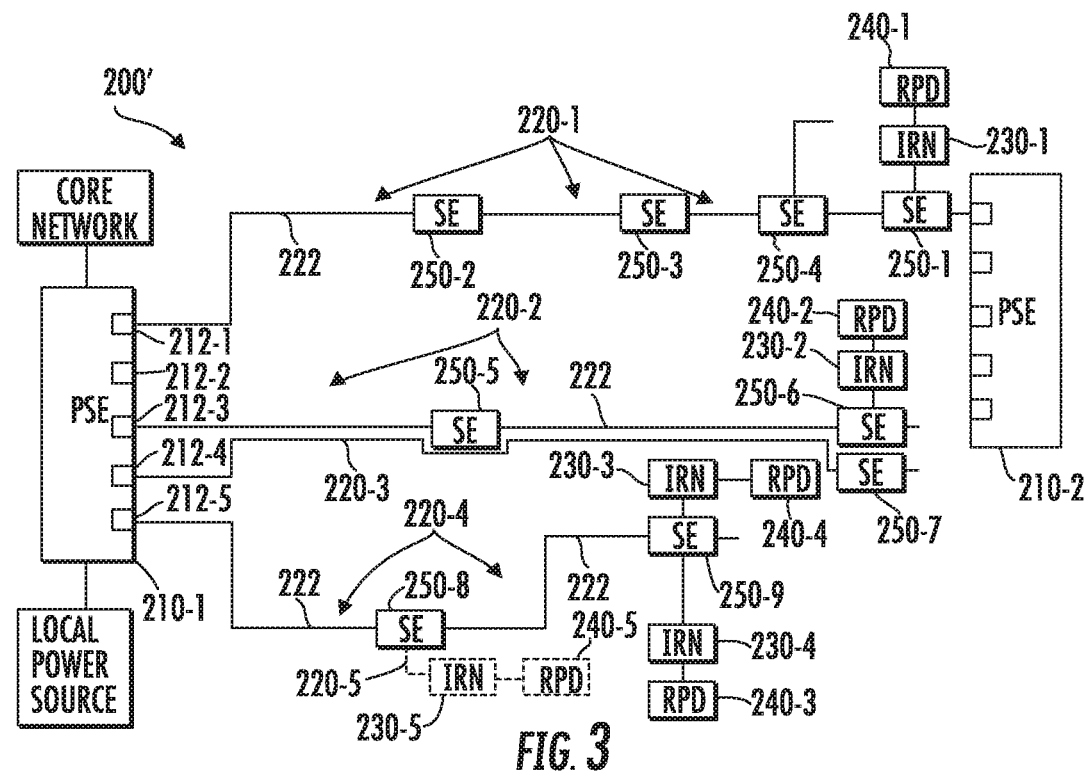
FIG. 3 is a schematic diagram illustrating a power and data connectivity micro grid according to further embodiments of the present invention.

FIG. 3 is a schematic diagram illustrating a power and data connectivity micro grid 200' according to further embodiments of the present invention. As can be seen by comparing FIGS. 2 and 3, the power and data connectivity micro grid 200' is similar to the above-described power and data connectivity micro grid 200, except that the power and data connectivity micro grid 200' includes a plurality of splice enclosures 250. The splice enclosures 250 may be installed at the locations where intelligent remote distribution node 230 are deployed in the power and data connectivity micro grid 200 of FIG. 2. The splice enclosures 250 may comprise hardened enclosures that include splice trays for both power conductors and for optical fibers. The splice enclosures 250 may be installed, for example, either underground or in the aerial outdoor plant. Each splice enclosure 250 may further include a connectorized power input port and a connectorized data input port that are configured to receive a power-plus-fiber cable 220. The connectorized power input port and a connectorized data input port may be implemented as separate connectorized power and data ports or as a hybrid power-data connector. Each splice enclosure 250 may also include one or more connectorized power output ports and one or more connectorized data output ports (which can be implemented as separate power and data ports or as hybrid power-data ports) that are configured to receive respective power-plus-fiber cables 220. In other embodiments, the ports on the splice enclosures 250 may not be connectorized. One pair of a power output port and a data output port may be viewed as a "pass-through" ports and the remaining pairs of power and data output ports may be viewed as "tap" ports that may be used to provide power and data connectivity to individual remote network-connected devices (or co-located groups thereof). When a new remote powered device 240-5 such as a small cell base station is to be deployed, an intelligent remote distribution node 230-5 may be installed at the site for the new small cell base station 240-5 (e.g., on a utility pole where the small cell radio 240-5 and antenna are mounted). A power-plus-fiber cable 220-5 may then be deployed between the newly-installed intelligent remote distribution node 230-5 and the closest splice enclosure 250-8 of the power and data connectivity micro grid 200', and a short jumper cable (or cables) may connect the intelligent remote distribution node 230-5 to the small cell radio 240-5. The splice enclosure 250-8 may be designed to output high voltage DC power signals (e.g., 380 V DC) to each output port thereof. The intelligent remote distribution nodes 230-5 may include step-down equipment such as a buck converter that reduces the voltage level of the DC power signal delivered thereto from the splice enclosure 250-8 to a level that is suitable for powering the remote powered devices 240-5 (e.g., 48-64 V DC). The intelligent remote distribution nodes 230-5 may or may not include pass-through power buses that allow daisy-chaining multiple intelligent remote distribution nodes 230-5 together.

To supply data connectivity to the newly-installed small cell base station 240-5, one or more of the optical fibers of power-plus-fiber cable 220-4 may be spliced in the splice enclosure 250-8 to connect to a data tap port of the splice enclosure 250-8. The data tap port of splice enclosure 250-8 may be connected to a data input port on an intelligent remote distribution node 230-5 via, for example a power-plus-fiber cable 220-5 (as shown) or by a separate optical jumper cable. Electrical and optical paths in the intelligent remote distribution node 230-5 may connect the power conductors and optical fibers of power-plus-fiber cable 220-5 to a local power port and a local data port, respectively, of the intelligent remote distribution node 230-5. The local power and data ports of the intelligent remote distribution node 230-5 are connected to the small cell base station 240-5 via, for example, separate power and optical jumper cables. In this fashion, the splice enclosure 250-8 and the intelligent remote distribution node 230-5 may provide power and data connectivity to the small cell base station 240-5.

The architecture of power and data connectivity micro grid 200' may be advantageous because the splice enclosures 250 may be relatively inexpensive since they may include significantly less technology than an intelligent remote distribution node 230, and hence a plurality of splice enclosures 250 may be installed along a power-plus-fiber cable 220 at relatively low cost. The splice enclosures 250 may provide a plurality of tap points along each power-plus-fiber cable 220 providing numerous locations where the cellular network operator may tap into the micro grid 200' to provide power and data connectivity for future installations.

While the discussion above of FIGS. 2 and 3 describes embodiments where an optical fiber data connection is provided to each remote powered device 240, it will be appreciated that embodiments of the present invention are not limited thereto. For example, in some cases, Power over Ethernet ("PoE") cables (or coaxial cables) may be used to provide power and data from an intelligent remote distribution node 230 to a remote powered device 240. PoE cables may be particularly useful in situations where the intelligent remote distribution nodes 230 are installed in close proximity to relatively low power remote powered devices 240. A security camera is a good example of a remote powered device 240 that would typically be powered via a PoE cable rather than a power-plus fiber cable, so long as the security camera was close enough to the intelligent remote distribution node 230 that PoE power delivery could be used. Additionally, while the description above assumes that the composite power-data cables 220 are implemented as power-plus-fiber cables, it will be appreciated that other types of composite power-data cables 220, such as coaxial cables, may be used in other embodiments.

Figure 4:
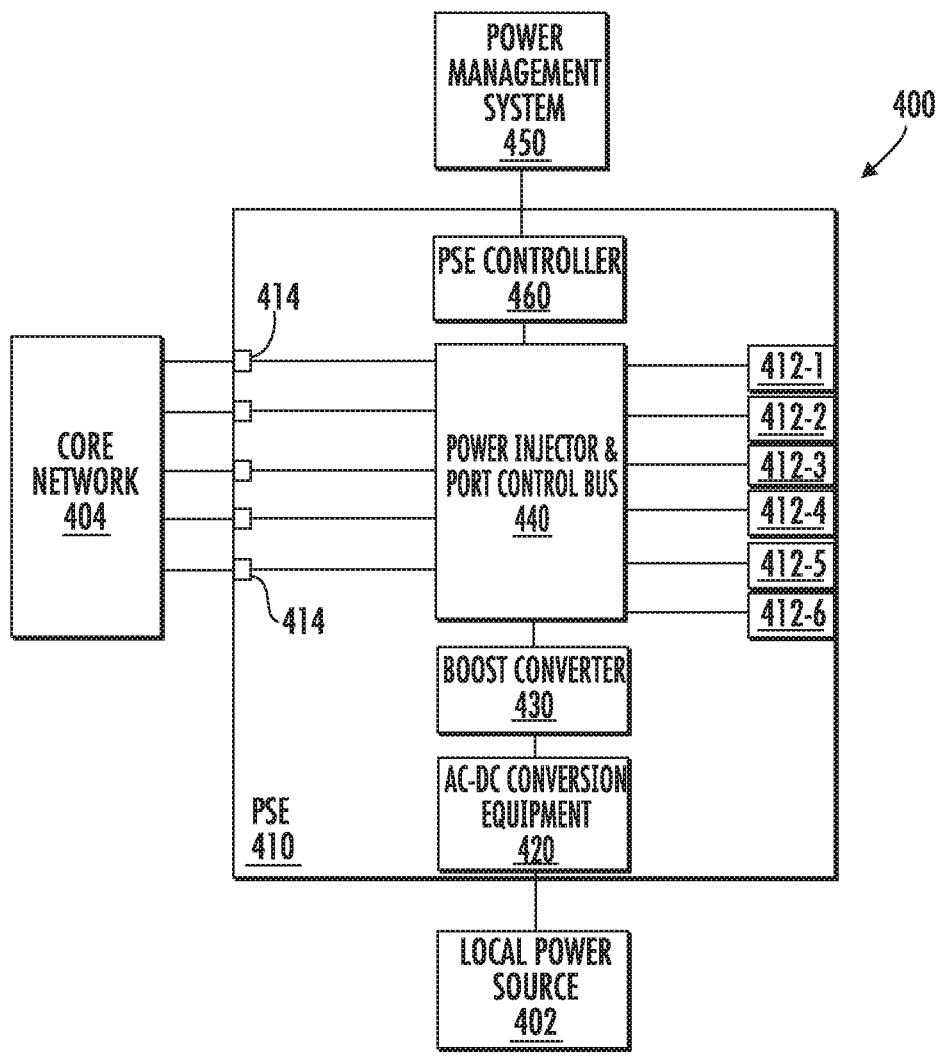
FIG. 4 is a schematic block diagram illustrating one of the power sourcing equipment devices of FIGS. 2 and 3.

FIG. 4 is a schematic block diagram illustrating a power source installation 400 that may be used to implement the power sourcing equipment devices 210 of FIGS. 2 and 3. As shown in FIG. 4, the power source installation 400 may include a local power source 402 and a power sourcing equipment device 410 that includes a plurality of hybrid power-data ports 412 (or, alternatively, separate power ports and data ports, as discussed above). The power sourcing equipment device 410 may comprise one or more transformers, converters and/or power conditioners that convert AC or DC supplied power received from the local power source 402 into DC power that is provided at the hybrid power-data ports 412. The power source installation 400 may also have connections to a telecommunications network 404 such as, for example, a core network of the cellular network operator. In some case, the power sourcing equipment device 210 may be located at a central office or other data distribution node of the cellular operator where a connection is available to the core network 404. In other cases, the power sourcing equipment device 210 may be located closer to the micro grid and connected to the core network 404 via, for example, fiber optic cabling connections.

The local power source 402 will typically comprise a connection to utility-provided AC power, although other local power sources may be used. The power sourcing equipment device 410 may include AC-DC power conversion equipment 420 that converts the AC power into a plurality of DC power signals that may be output through the hybrid power-data ports 412 (or through separate power data ports). In some embodiments, the power sourcing equipment device 410 may further include a boost converter 430 that steps of the voltage of the DC power signals to a desired level such as, for example, 380 V. In some cases, the stepped up voltage level may be between 260-1500 V DC. Increasing the voltage of the DC power signal reduces the current levels, which may reduce $I^2R$ power losses as the power signals are delivered over cabling connections 220 to the remote powered devices 240.

The power sourcing equipment device 410 further includes a power injector and port control bus 440 that is coupled to the output of the boost converter 430 or the output of the AC-DC conversion equipment 420 if the boost converter 430 is not included on the power sourcing equipment device 410. The power injector and port control bus 440 may be configured to selectively inject DC power onto the electrical conductor pairs included in the hybrid power-data ports 412 in order to inject DC power onto the power-plus-fiber cables 220 that are connected to the respective hybrid power-data ports 412 (or through separate power data ports). A power management system 450 may also be part of the power source installation 400, and may be internal or external to the power sourcing equipment device 410. The power management system 450 manages power delivery to the remote power devices 240 by enabling and disabling the hybrid power-data ports 412 of the power sourcing equipment device 410.

The power sourcing equipment device 410 further includes a plurality of data ports 414 that may be coupled to the core network 404 of the cellular network operator. Data may be transferred between the core network 404 and the power sourcing equipment device 410 via the data ports 414. The data ports 414 may comprise, for example, fiber optic connectors. However, the data ports 414 may alternatively and/or additionally comprise electrical connectors, wireless links or the like. The data ports 414 may be coupled to the hybrid power-data ports 412 (or to individual data ports if the hybrid ports 412 are replaced with separate power and data ports) through, for example, the power injector and port control bus 440.

The power source installation 400 may be configured to control the delivery of power to each of the hybrid power-data ports 412 as well as to control the transfer of data between the hybrid power-data ports 412 and the core network 404. In the depicted embodiment, the power injector and port control bus 440 is configured to control both the delivery of power to the hybrid power-data ports 412 and the transfer of data between the hybrid power-data ports 412 and the data ports 414. In such embodiments, the power injector and port control bus 440 may include, for example, one or more optical switches. In other embodiments, different control units may control the delivery of power to the hybrid power-data ports 412 and the transfer of data between the hybrid power-data ports 412 and the data ports 414.

Figure 5:
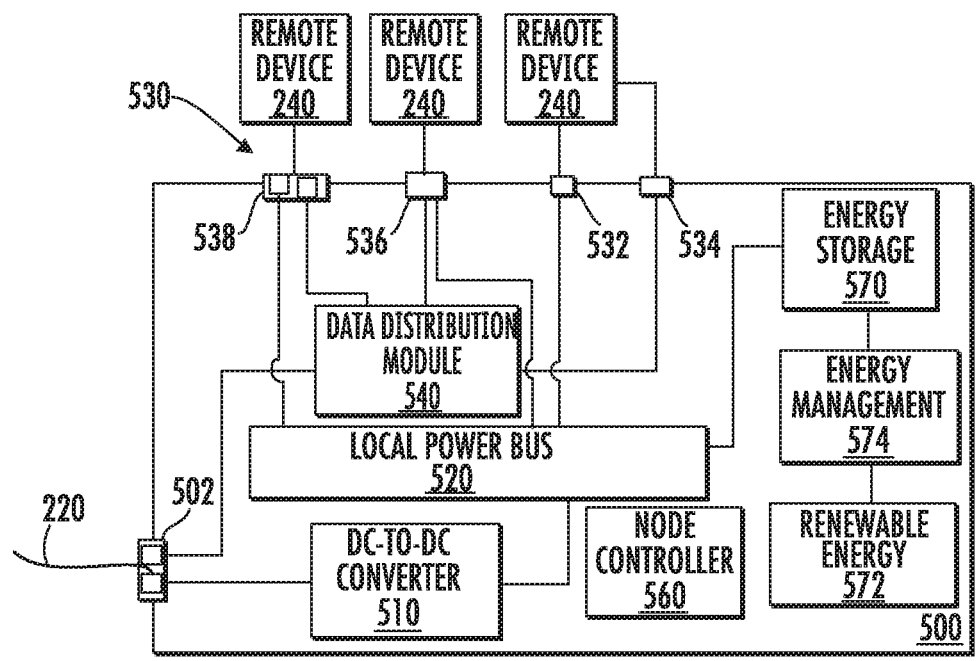
FIG. 5 is a schematic block diagram of an intelligent remote distribution node that may be used in the power and data connectivity micro grids according to embodiments of the present invention.

FIG. 5 is a schematic block diagram of an intelligent remote distribution node 500 that may be used in the power and data connectivity micro grids according to embodiments of the present invention. For example, the intelligent remote distribution nodes 230 that are discussed above with reference to FIG. 3 may be implemented using the intelligent remote distribution nodes 500 of FIG. 5.

As shown in FIG. 5, the intelligent remote distribution node 500 may include an input port 502, a uni-directional or bi-directional DC-to-DC converter 510, a local power bus 520, a plurality of local ports 530 and a data distribution module 540. The input port 502 and the local ports 530 may be implemented as hybrid power-data ports or as individual power and data ports. The intelligent remote distribution node 500 may be configured to receive power and data from an external source (e.g., from a power sourcing equipment device 210 or from a splice enclosure 250 via a composite power-data cable) and to deliver the received power and data in a suitable format to one or more remote powered devices 240.

In some embodiments, each intelligent remote distribution node 500 may receive a low voltage DC power signal such as, for example, a 380 V DC power signal. The DC power signal may be received at the input port 502. The input port 502 may comprise, for example, a hybrid power-data connector that receives a power-plus-fiber cable 220 in some embodiments. The power conductors of the input port 502 may be coupled to the DC-to-DC converter 510. If the DC-to-DC converter 510 is a bi-directional DC-to-DC converter, it may operate as a buck converter with respect to power signals received from the input port 502 and may operate as a boost converter with respect to power signals that are passed from the DC-to-DC converter 510 to the input port 502. The DC-to-DC converter 510 is coupled to a local power bus 520 that receives stepped-down power signals from the DC-to-DC converter 510 and which can also deliver stepped-up power signals to the DC-to-DC converter 510. The local power bus 520 may be coupled to one or more of the local ports 530 that act as tap ports. Each local port 530 may be connected to a remote powered device 240 to provide DC power and data connectivity to such devices 240.

The input port 502 may also include data paths that connect to data carrying elements of any composite power-data cable 220 connected to the input port 502. The data paths of the input port 502 may be coupled to the data distribution module 540. The data distribution module 540 may include a switching unit and appropriate media conversion equipment so that the data distribution module 540 may exchange data between the local ports 530 in a suitable format. The data distribution module 540 may or may not convert data before forwarding the data to a local port 530 or to the input port 502.

In some embodiments, each local port 530 may be implemented as a conventional DC power port 532 that receives DC power directly from the local power bus 520 and a separate fiber optic port 534 that exchanges optical data with the data distribution module 540. Separate power and fiber optic jumper cables may be used to connect the DC power port 532 and the fiber optic port 534 to a remote powered device 240.

In other embodiments, the local power ports 530 may comprise PoE ports 536. The local power bus 520 may include PoE equipment and may deliver power in a suitable format to the local PoE ports 536 so that the remote powered device 240 may be powered over an Ethernet cable that extends between the local port 536 and a remoted powered device 240. The data distribution module 540 may include optical-to-Ethernet and Ethernet-to-optical interfaces that convert the data received over the power-plus-fiber cable 220 into Ethernet format for transmission over the Ethernet cable coupled to local port 536 and that convert the data received at local port 536 from the remote powered device 240 into an optical signal that may be transmitted through the input port 502 back to the power sourcing equipment device 210.

In still other embodiments, the local power port(s) 530 may comprise hybrid power-data ports that are connected to remote powered devices 240 via respective power-plus-fiber cables 220. FIG. 5 illustrates an intelligent remote distribution node 500 that includes various different types 532/534; 536; 538 of local ports 530. It will be appreciated, however, that the intelligent remote distribution node 500 may only include a single local port 530, may include only a single type of local port 530, or may include various combinations of different types of local ports 530 in other embodiments. It will also be appreciated that other different types of local ports 530 may be included in still other embodiments.

As is further shown in FIG. 5, the intelligent remote distribution node 500 may further include an energy storage device 570 such as a battery and may also include a renewable energy device 572 such as solar cells, a turbine or the like. A energy storage and management system 574 may be included in the intelligent remote distribution node 500 that may control operation of the energy storage device 570 and any renewable energy device 572. For example, if a power sourcing equipment device 210 fails, the energy storage and management system 574 may control the energy storage device 570 and/or the renewable energy device 572 to deliver power to the local power bus 520 and from the local power bus 520 to the bi-directional DC-to-DC converter 510, and may control the bi-directional DC-to-DC converter 510 to step-up the voltage of the power received from the energy storage device 570 and any renewable energy device 572 so that a higher voltage DC power signal may be output through the input port 502 to power other remote powered devices 240 in the micro grid 200.

The intelligent remote distribution node 500 further includes a node controller 560 that may control overall operation of the intelligent remote distribution node 500. While in most cases the intelligent remote distribution nodes according to embodiments of the present invention may distribute both power and data, it will be appreciated that in some applications the intelligent remote distribution nodes may only be used to distribute power, either because a remote powered device does not require data connectivity or because the remote powered device has data connectivity through a different mechanism (e.g., a wireless link).

Figure 6:
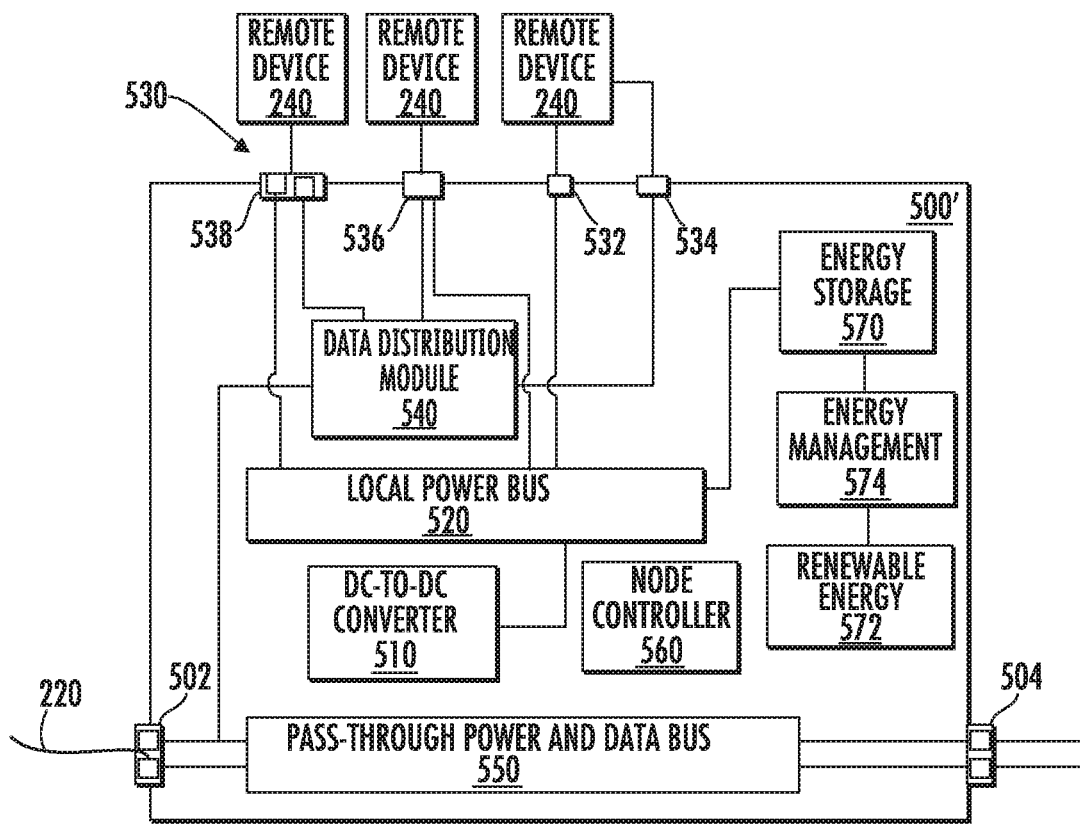
FIG. 6 is a schematic block diagram of another intelligent remote distribution node that may be used in the power and data connectivity micro grids according to embodiments of the present invention.

FIG. 6 is a schematic block diagram of another intelligent remote distribution node 500' that may be used in the power and data connectivity micro grids according to embodiments of the present invention. As can be seen, the intelligent remote distribution node 500' may be identical to the intelligent remote distribution node 500 except that intelligent remote distribution node 500' further includes a pass-through power and data bus 550 and an output port 504. The output port 504 may be implemented as a hybrid power-data port or as a separate power output port and a data output port. The intelligent remote distribution node 500' may be suitable for use in the power and data micro grid 200 discussed above with reference to FIG. 2. It will also be appreciated that any of the intelligent remote distribution nodes disclosed in PCT Publication No. WO 2018/017544 A1 may be used to implement the intelligent remote distribution nodes included in the power and data connectivity micro grids according to embodiments of the present invention.

FIGS. 7A-7E are schematic diagrams illustrating how a power and data connectivity micro grid according to embodiments of the present invention may be incrementally formed as part of the regular expansion of a communications network. It should be noted that in FIGS. 7A-7E, intelligent remote distribution nodes 230 would be installed at (or near) each remote powered device. The intelligent remote distribution nodes 230 are not shown in FIGS. 7A-7E to simplify the drawings, but it will be understood that the intelligent remote distribution nodes 230 are considered to be present and connected between the splice enclosures 250 and the various remote powered devices.

Figure 7A:
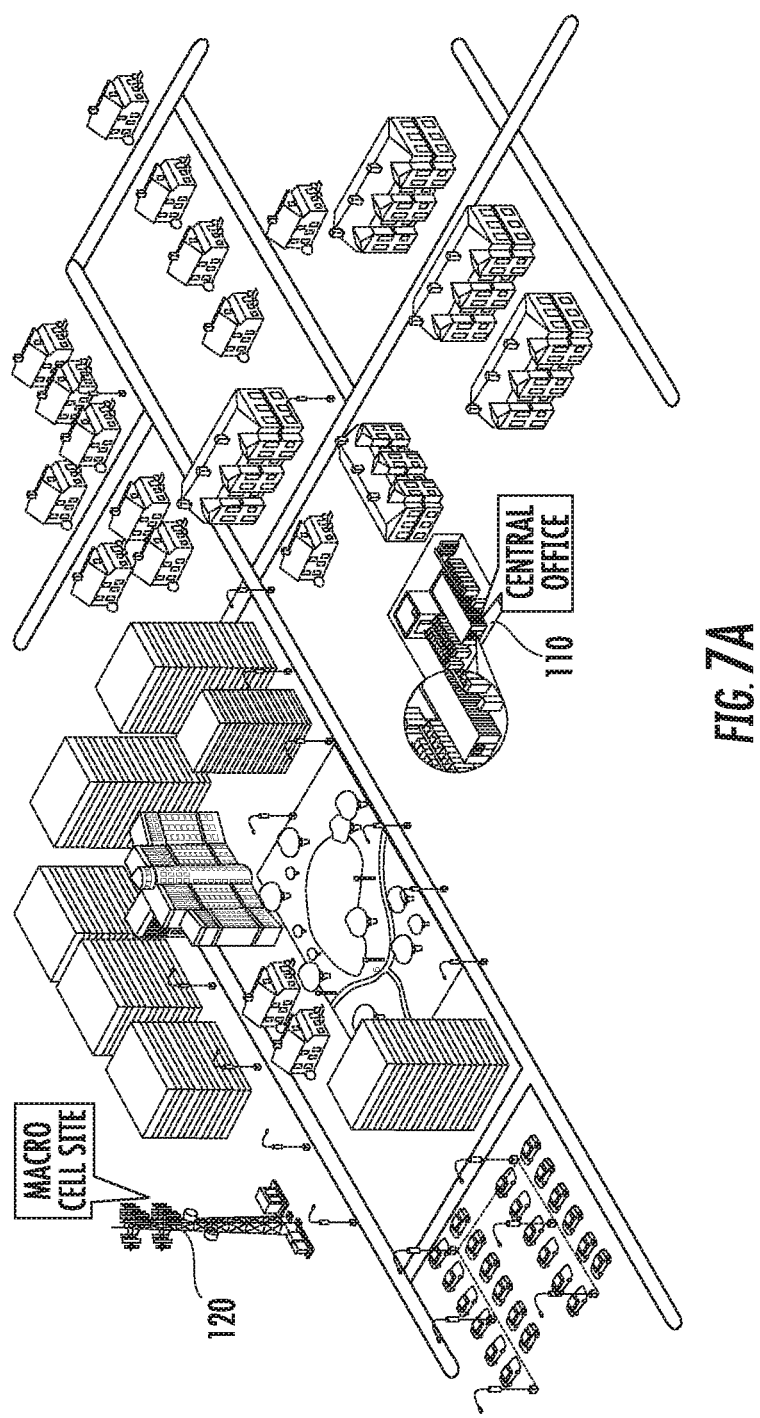
FIGS. 7A-7E are schematic diagrams illustrating how a power and data connectivity micro grid according to embodiments of the present invention may be incrementally formed as part of the regular expansion of a communications network.

Referring first to FIG. 7A, a cellular network operator may initially have a central office 110 and a macrocell base station 120 located in a high density area. AC power from the electric utility grid may be available at both of these locations. Conventionally, as the cellular network operator would add new installations within the area shown, electrical power connections would be provided for each such new installation along with a backhaul connection to the core network. The electric power connections might be a local connection to the electric power grid or a power-plus-fiber cable that provided both electric power and data connectivity to the new installation.

Figure 7B:
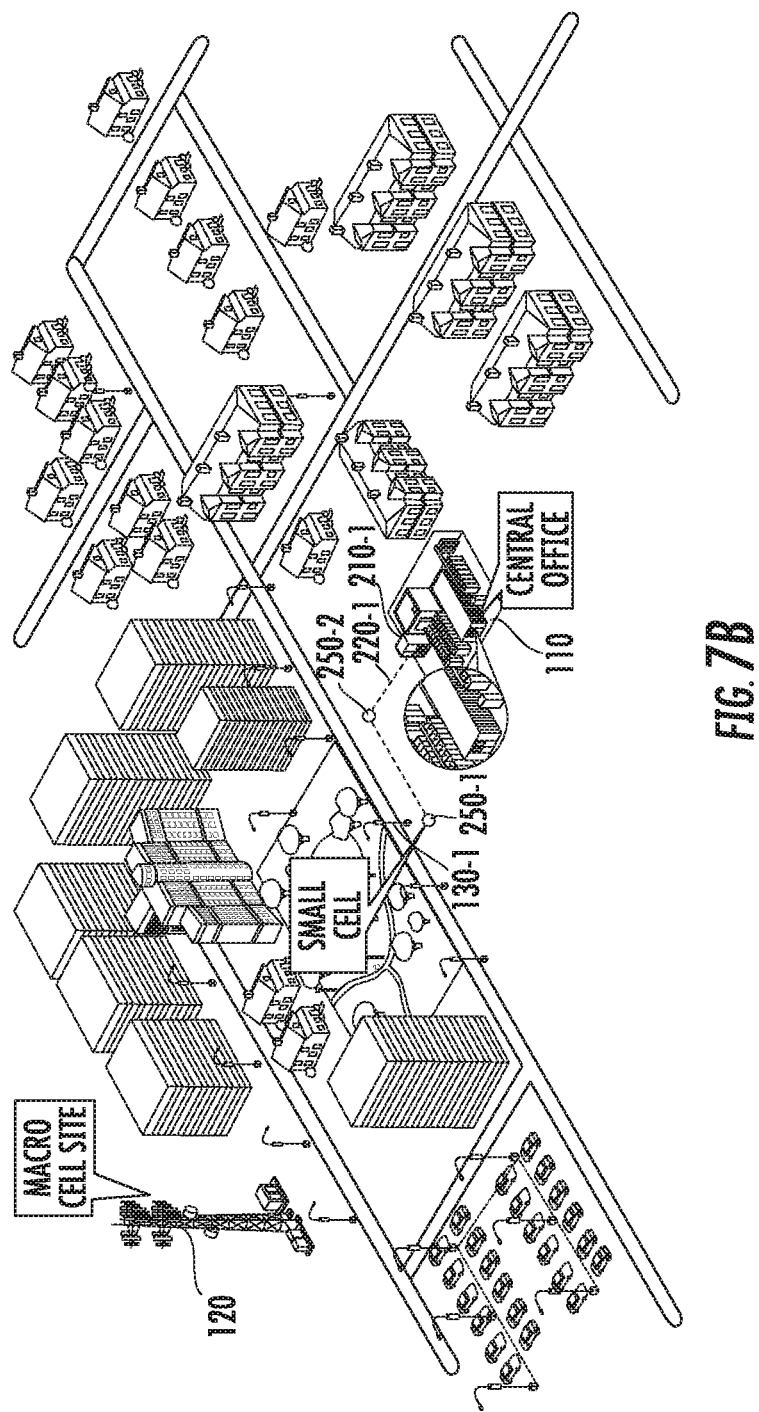

Referring next to FIG. 7B, the cellular network operator may later add a new remote powered device to the network such as a small cell base station 130-1. As shown in FIG. 7B, a power-plus-fiber cabling connection 220 is provided between a power sourcing equipment device 210-1 and the small cell base station 130-1. In the example of FIG. 7B, the power sourcing equipment device 210-1 is located at the central office 110, although it will be appreciated that the power sourcing equipment device 210-1 may be located at any suitable location. A power-plus-fiber cable 220-1 is routed from the power sourcing equipment device 210-1 to the small cell base station 130-1. The power-plus-fiber cable 220-1 may be over provisioned to include far more power and data carrying capacity than is required to support the small cell base station 130-1. Additionally, splice enclosures 250-1, 250-2 may be installed along the power-plus-fiber cable 220-1 to provide tap points in the micro grid where additional power-plus-fiber cables 220 may be attached in the future to provide power and data connectivity to network-connected powered devices 240 that are installed near power-plus-fiber cable 220-1 in the future.

Figure 7C:
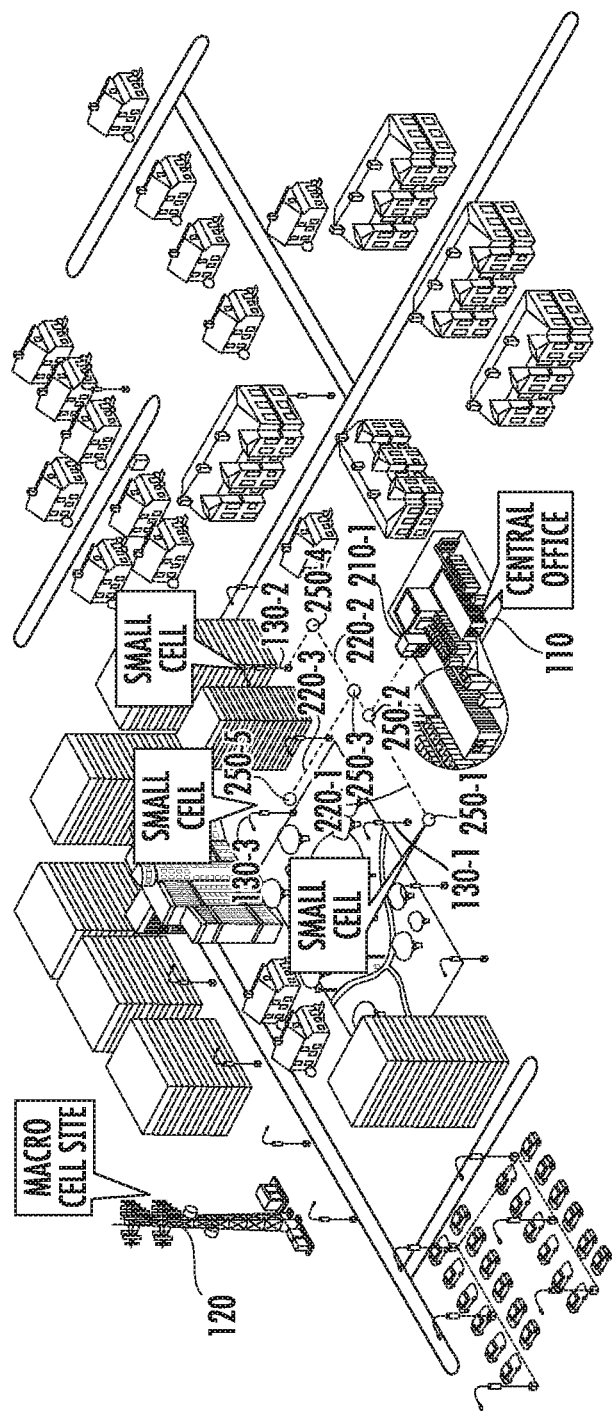

Referring next to FIG. 7C, the cellular network operator may later deploy two additional small cell base stations 130-2, 130-3. Instead of installing an additional power-plus-fiber cable 220-2, 220-3 between each new small cell base stations 130-2, 130-3 and the power sourcing equipment device 210-1, a second power-plus-fiber cable 220-2 may be installed between the splice enclosure 250-2 and the small cell base station 130-2. Two additional splice enclosures 250-3, 250-4 may be installed along the power-plus-fiber cable 220-2. A third power-plus-fiber cable 220-3 may be installed between the splice enclosure 250-3 and the third small cell base station 130-3, and a fifth splice enclosure 250-5 may be installed along the third power-plus-fiber cable 220-3. In this fashion, power and data connectivity may be deployed to the small cell base stations 130-2, 130-3, using short power-plus-fiber cables 220-2, 220-3 that may be quickly and inexpensively be deployed, and additional splice enclosures 250-3, 250-4, 250-5 may be installed that mat act as tap points for future installations.

Figure 7D:
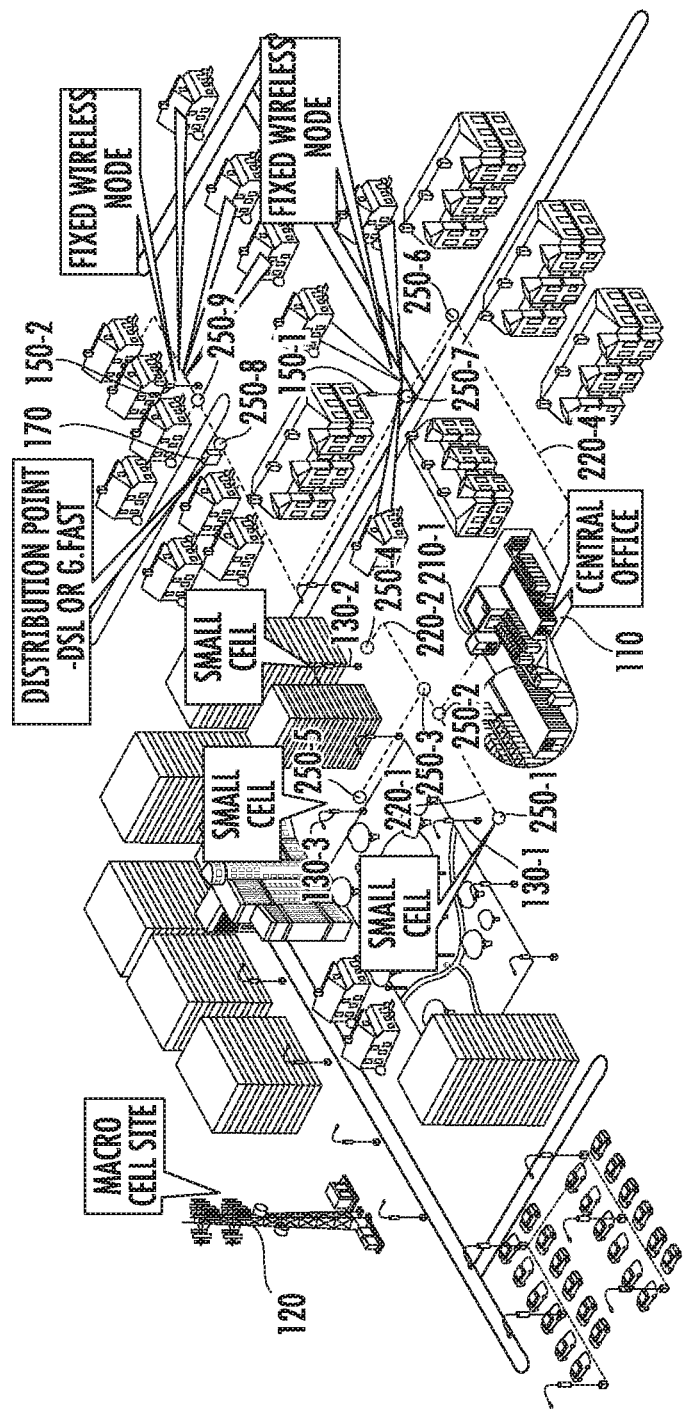

FIG. 7D illustrates how the power and data micro grid may be further built out while providing power to additional new installations in the vicinity of the micro grid. As shown in FIG. 7D, a pair of fixed wireless access points 150-1, 150-2 may later be installed. Power and data connectivity are provided to the fixed wireless access points 150 by deploying a power-plus-fiber cable 220-4 from the power sourcing equipment device 210-1 to the fixed wireless access node 150-2. Power-plus-fiber cable 220-4 is routed so that it also runs by fixed wireless access node 150-1, and a splice enclosure 250-7 is installed on power-plus-cable 220-4 at that location so that power and data connectivity may be provided to fixed wireless access node 150-1. Additional splice enclosures 250-6, 250-8 and 250-9 are installed along power-plus-fiber cable 220-4 to facilitate later expansion of the micro grid.

As is further shown in FIG. 7D, thereafter a DSL distribution point 170 may be installed to provide DSL service to a plurality of homes. The DSL distribution point 170 may be connected to the power and data connectivity micro grid by installing a short power-plus-fiber cable (not shown) between the splice enclosure 250-8 and the DSL distribution point 170.

Figure 7E:
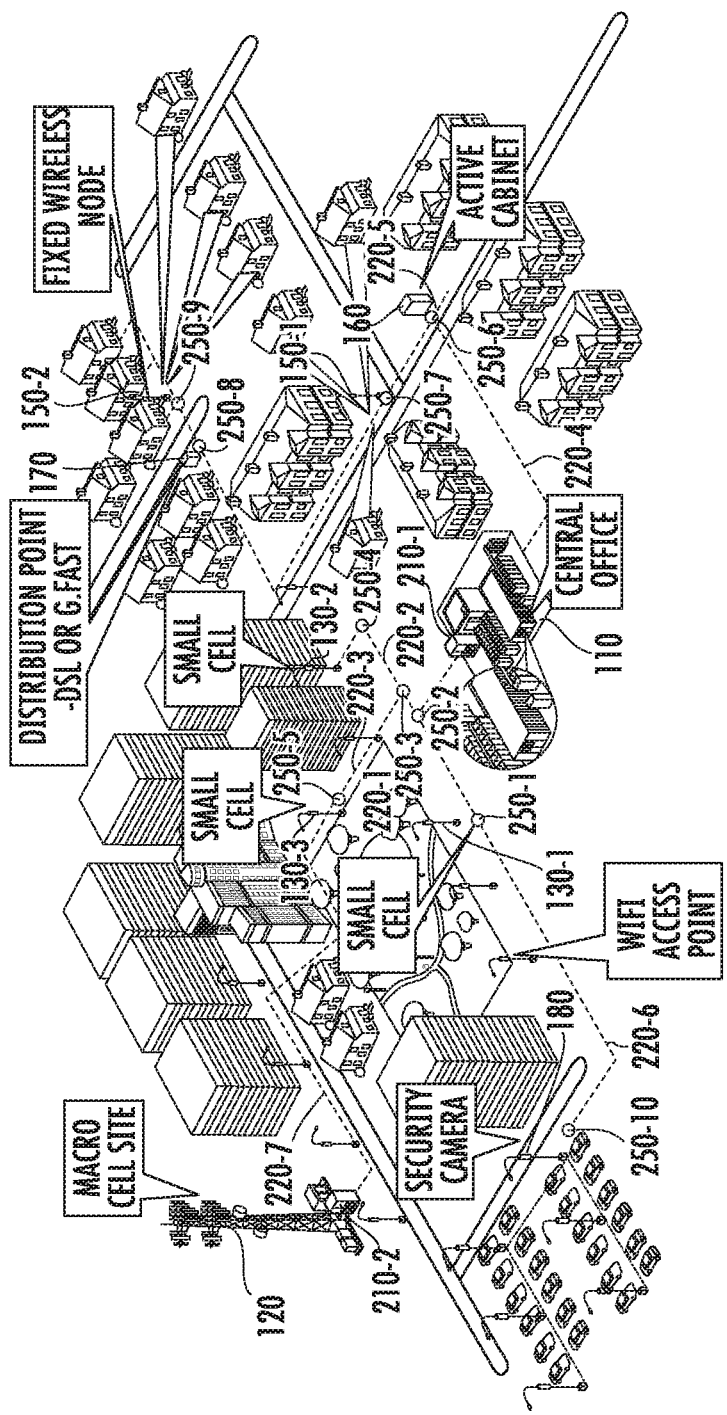

Referring to FIG. 7E, thereafter an active cabinet 160 may be connected to the power and data connectivity micro grid by installing a short power-plus-fiber cable 220-5 between the splice enclosure 250-6 and the active cabinet 160. A security camera 180 may also be installed and connected to the micro grid 100 by installing a new splice enclosure 250-10 adjacent the security camera 180 and installing a new power-plus-fiber cable 220-6 that extends between splice enclosure 250-10 and splice enclosure 250-1. Additionally, a second power sourcing equipment device 210-2 may be installed at the macro cell base station 120. A power-plus-fiber cable 220-7 may be installed that connects a first hybrid power-fiber port on power sourcing equipment 210-2 to splice enclosure 250-5. Connecting the second power sourcing equipment device 210-2 to splice enclosure 250-5 allows double the power capacity to be delivered to splice enclosure 250-5 at the edge of the micro grid. Additionally, feeding a splice enclosure 250 from two different power sourcing equipment devices 210 allows configuring power delivery to the powered remote devices 240 so that power loss is reduced (by feeding devices over the power cabling connection that has the lower cumulative resistance) and also provides redundancy in the event of a power outage or equipment malfunction at one of the two power sourcing equipment devices 210. While not shown in FIG. 7E, additional splice enclosures 250 may be installed along power-plus-fiber cable 220-7 that serve as future tap points.

Figure 8A:
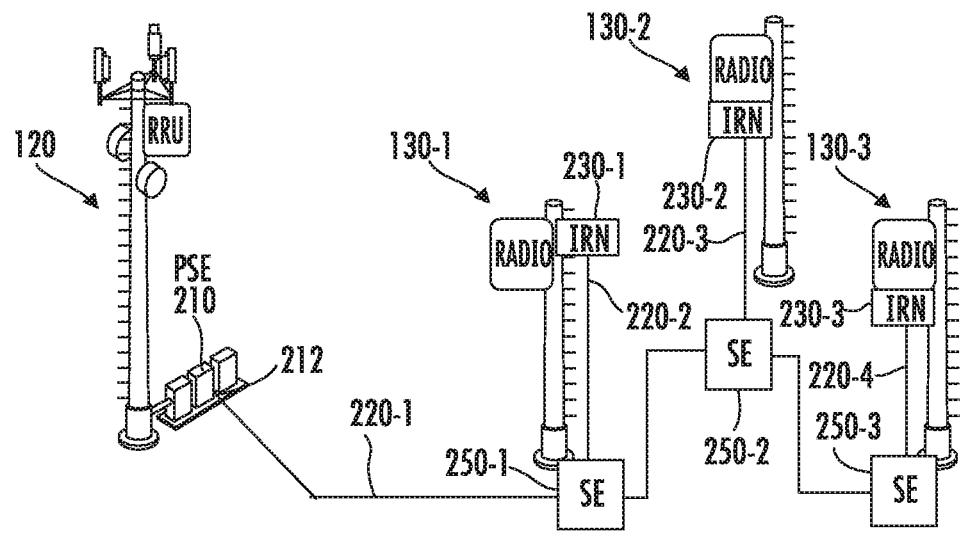
FIGS. 8A-8C are schematic drawings illustrating how the power and data connectivity micro grids according to embodiments of the present invention may support different types of remote powered devices.
Figure 8B:
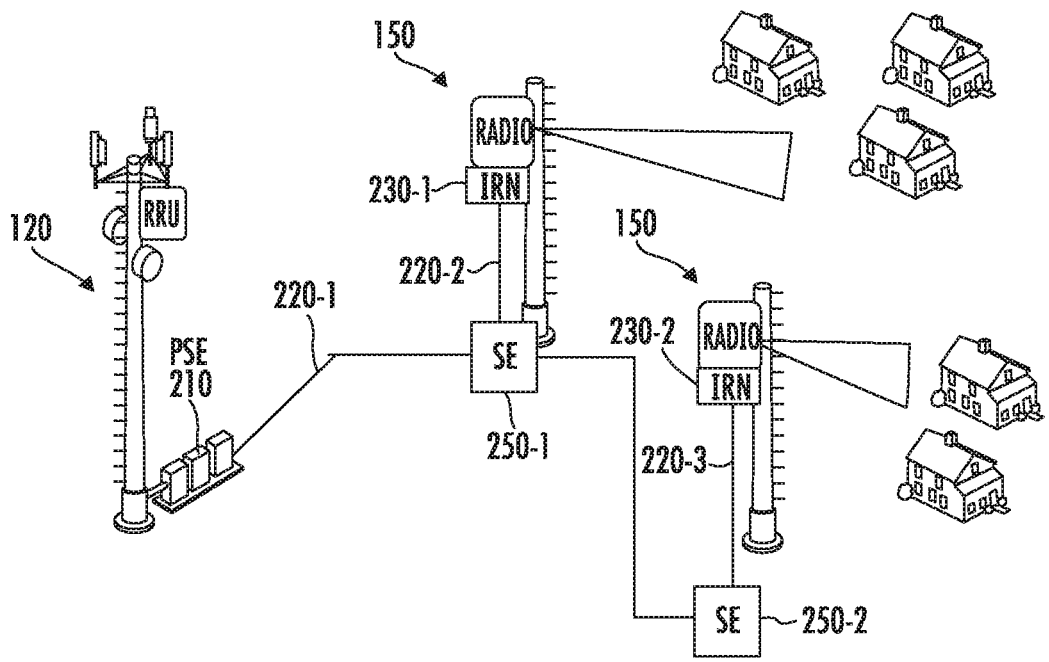
Figure 8C:
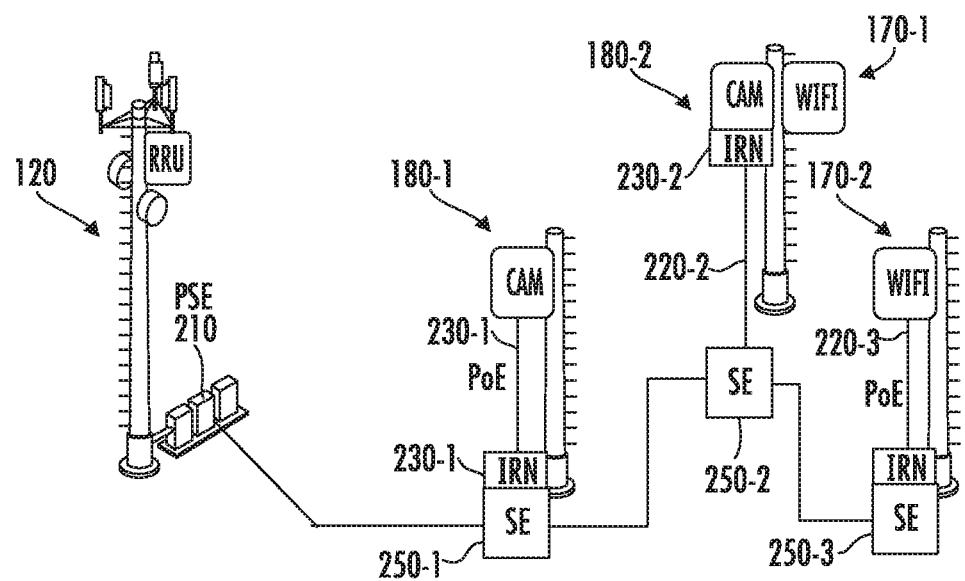

FIGS. 8A-8C are schematic drawings illustrating how the power and data connectivity micro grids according to embodiments of the present invention may support different types of remote powered devices.

Referring first to FIG. 8A, a scenario is depicted in which several small cell base stations 130 are connected to a power and data connectivity micro grid according to embodiments of the present invention. As shown in FIG. 8A, three small cell base stations 130 may be deployed within the coverage area of a macrocell base station 120. A power sourcing equipment device 210 may be installed at the macrocell base station 120 or at any other suitable sight. The macrocell base station 120 may be a particularly convenient location as an AC power source, cabinetry and backhaul equipment are all located at macrocell base stations. As shown in FIG. 8A, a power-plus-fiber cable 220-1 may be connected to, for example, a hybrid power-data port 212 on the power sourcing equipment device 210. The power-plus-fiber cable 220-1 may be deployed so that it extends near each of the small cell base stations 130. Splice enclosures 250-1 through 250-3 may be installed along the power-plus-fiber cable 220-1. Each small cell base station 130 may include a remote radio head and a base station antenna (not shown) that are co-mounted on a raised structure such as a utility pole, sign, antenna tower or the like. A respective intelligent remote distribution node 230 may be mounted on the raised structure adjacent each remote radio head. A power-plus-fiber cable 220 may be routed from each respective splice enclosure 250 to a respective one of the intelligent remote distribution nodes 230. Each intelligent remote distribution node 230 may down-convert the voltage of the DC power signal received over the respective power-plus-fiber cable 220 to a suitable voltage for powering the remote radio head, which may be connected to the intelligent remote distribution node 230 via, for example, a power jumper cable and a fiber optic jumper cable.

The power-plus-fiber cable 220-1 is connected to the splice enclosure 250-1. One or more of the optical fibers that are included in power-plus-fiber cable 220-1 may be connected to a tap port of the splice enclosure 250-1 (i.e., the port that connects to power-plus-fiber cable 220-2), while the remaining optical fibers may be connected to a pass-through port of the splice enclosure 250-1 (i.e., the port that is connected to the segment of power-plus-cable 220-1 that extends between splice enclosure 250-1 and splice enclosure 250-2). The optical fibers may be divided and routed differently in a fiber optic splice tray included within the splice enclosure 250-1. Likewise, a power conductor splice tray may be included within splice enclosure 250-1 that divides the electric power input thereto between the tap port and the output port.

FIG. 8B schematically illustrates how a pair of fixed wireless access nodes 150 may be connected to a power and data connectivity micro grid according to embodiments of the present invention. As shown in FIG. 8B, a power sourcing equipment device 210 may be installed at the macrocell base station 120 or at any other suitable sight. A power-plus-fiber cable 220-1 may be connected to the power sourcing equipment device 210 and may be deployed so that it extends near each of the fixed wireless access nodes 150. Splice enclosures 250-1 and 250-2 may be installed along the power-plus-fiber cable 220-1. Each fixed wireless access node 150 may include a radio and an antenna (not shown) that are co-mounted on a raised structure such as a utility pole, sign, antenna tower or the like. A respective intelligent remote distribution node 230 may be mounted on the raised structure adjacent each radio. A power-plus-fiber cable 220 may be routed from each splice enclosure 250 to a respective one of the intelligent remote distribution nodes 230. Each intelligent remote distribution node 230 may down-convert the voltage of the DC power signal received over the respective power-plus-fiber cable 220 to a suitable voltage for powering the radio, which may be connected to the intelligent remote distribution node 230 via a power jumper cable.

FIG. 8C schematically illustrates how a pair of WiFi access points 170 and cameras 180 may be connected to a power and data connectivity micro grid according to embodiments of the present invention. As shown in FIG. 8C, a power sourcing equipment device 210 may be installed at the macrocell base station 120 or at any other suitable sight. A power-plus-fiber cable 220-1 may be connected to the power sourcing equipment device 210 and may be deployed so that it extends near each of the WiFi access points 170 and cameras 180. Splice enclosures 250-1 through 250-3 may be installed along the power-plus-fiber cable 220-1. Intelligent remote distribution nodes 230 are co-located at splice enclosures 250-1 and 250-3. Intelligent remote distribution nodes 230-1 and 230-3 may convert the power signals received from respective splice enclosures 250-1 and 250-3 into PoE power signals and may convert the optical data into Ethernet format and transmit the data over respective PoE cables to the camera 180-1 and the WiFi access point 170-2. Splice enclosure 250-2 may be connected to a tower-mounted intelligent remote distribution node 230-2 via a power-plus-fiber cable 220-2. The camera 280-2 and the WiFi access point 170-1 may each be connected to local ports on intelligent remote distribution node 230-2.

Each intelligent remote distribution node 230 may be configured to handle a rated amount of power. For example, an intelligent remote distribution node 230 may be rated to deliver up to 1000 Watts of power to a connected remote powered device 240. The power conversion efficiency of the DC-to-DC converter included in the intelligent remote distribution node 230 may be a function of the power drawn by the remote powered device 240. The intelligent remote distribution nodes 230 may be designed, for example, to achieve peak power conversion efficiency when their converters are operating at the peak rated power delivery for the remote powered device (e.g., 1000 Watts in this example).

In practice, many remote powered devices draw varying levels of power. For example, a small cell base station may draw peak power during periods of heavy usage (e.g., during rush hour, lunch time, etc.) but may draw significantly lower levels of power at other times (e.g., at night). As such, the power converters in the intelligent remote distribution nodes 230 may often not provide peak power conversion efficiency. While the reduction in power conversion efficiency often is relatively small (e.g., from 95% to 93%), amount of power drawn over the power and data micro grids according to embodiments of the present invention may be quite large, and hence even small reductions in power conversion efficiency can result in large increases in the operating expenses for the cellular network operator. As discussed above with reference to FIGS. 5 and 6, in some embodiments, the intelligent remote distribution nodes 230 may include an energy storage device that may allow the intelligent remote distribution nodes to operate at peak power conversion efficiency a greater percentage of the time.

Referring again to FIG. 5, during times when a connected remote powered device 240 is drawing less than the full rated power for the DC-to-DC converter 510, the excess power generated by the DC-to-DC converter 510 may be used to charge the energy storage device 570 (so long as the energy storage device 570 is not fully charged). Then, in situations where the remote powered device 240 draws more power than the DC-to-DC converter 510 can output, the energy storage device 570 may augment the power provided by the DC-to-DC converter 510 to meet the power requirements of the remote powered device 240. Since the DC-to-DC converter 510 can be run at peak efficiency anytime the remote powered device 240 draws power in excess of the rated capacity of the DC-to-DC converter 510, as well as any time the energy storage device 570 is being recharged, the intelligent remote distribution node 500 may operate, on average, at high power conversion levels, reducing a cellular network operators operating expenses. The energy storage device 570 may also provide backup power during power black outs.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Well-known functions or constructions may not be described in detail for brevity and/or clarity. As used herein the expression "and/or" includes any and all combinations of one or more of the associated listed items.

It will be understood that features illustrated with one example embodiment above can be incorporated into any of the other example embodiments. Thus, it will be appreciated that the disclosed embodiments may be combined in any way to provide many additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A power and data connectivity micro grid, comprising:
a local power supply;
a first power sourcing equipment device having a first power port, a second power port, a first data port and a second data port, the first power sourcing equipment device coupled to the local power supply and configured to deliver respective direct current ("DC") power signals to the first power port and the second power port;
a first splice enclosure having a power input port, a data input port, a power tap port, a data tap port, a power output port and a data output port;
a second splice enclosure having a power input port, a data input port, a power tap port, a data tap port, a power output port and a data output port;
a third splice enclosure;
a first composite power-data cable coupled between the first power port and the first data port of the first power sourcing equipment device and the power input port and the data input port of the first splice enclosure;
a second composite power-data cable coupled between the second power port and the second data port of the first power sourcing equipment device and the power input port and the data input port of the second splice enclosure; and
a first remote powered device that is configured to receive power and data output through the respective power output port and data output port of the first splice enclosure,
wherein the third splice enclosure is coupled along the first composite power-data cable between the first power sourcing equipment device and the first splice enclosure.

2. The power and data connectivity micro grid of claim 1, wherein respective voltage levels of the DC power signals output at the first power port and the second power port of the first power sourcing equipment device are between 260 volts and 1500 volts.

3. The power and data connectivity micro grid of claim 2, wherein a power input port and a data input port of the third splice enclosure are coupled to the first power port and the first data port of the first power sourcing equipment device via a first segment of the first composite power-data cable, and a power output port and a data output port of the third splice enclosure are coupled to the power input port and the data input port of the first splice enclosure, respectively, via a second segment of the first composite power-data cable.

4. The power and data connectivity micro grid of claim 3, further comprising:
a second power sourcing equipment device having a third power port and a third data port, the second power sourcing equipment device configured to deliver a DC power signal to the third power port; and
a third composite power-data cable coupled between the third power port and the third data port of the second power sourcing equipment device and the power output port and the data output port of the first splice enclosure.

5. The power and data connectivity micro grid of claim 1, further comprising a first remote distribution node coupled between the first splice enclosure and the first remote powered device, wherein the power tap port and the data tap port of the first splice enclosure are coupled to a power input port and a data input port of the first remote distribution node, respectively, and wherein the first remote powered device is coupled to a local power port and a local data port of the first remote distribution node via a composite power-data cable.

6. The power and data connectivity micro grid of claim 1, wherein the first composite power-data cable comprises a power-plus-fiber cable that includes a plurality of segments, where each segment includes a plurality of optical fibers and a plurality of pairs of power conductors, and wherein some of the segments include more optical fibers than other of the segments.

7. The power and data connectivity micro grid of claim 1, further comprising a fourth splice enclosure that is coupled to the first power sourcing equipment device by a first segment of the second composite power-data cable and that is coupled to the second splice enclosure by a second segment of the second composite power-data cable.

8. The power and data connectivity micro grid of claim 7, further comprising a third composite power-data cable that extends between the first power sourcing equipment device and a fifth splice enclosure, the third composite power-data cable extending adjacent at least the first segment of the second composite power-data cable.

9. The power and data connectivity micro grid of claim 5, wherein the first remote distribution node is configured to step down a voltage of a DC power signal received at the power input port of the first remote distribution node and to output a lower voltage DC power signal through the local power port of the first remote distribution node.

10. The power and data connectivity micro grid of claim 5, wherein the first remote distribution node includes an associated energy storage device and a bi-directional DC-to-DC converter that is configured to pass DC power from the energy storage device to the first remote powered device in response to power being lost at the first power sourcing equipment device.

11. The power and data connectivity micro grid of claim 10, wherein the DC-to-DC converter is further configured to provide power to the first remote powered device if the first remote powered device requires more power than is being output by the DC-to-DC converter.

12. A power and data connectivity micro grid, comprising:
a first local power supply;
a second local power supply;
a first power sourcing equipment device having a first power port, a second power port, a first data port and a second data port, the first power sourcing equipment device coupled to the first local power supply and configured to deliver respective direct current ("DC") power signals to the first power port and the second power port;
a second power sourcing equipment device having a third power port, a fourth power port, a third data port and a fourth data port, the second power sourcing equipment device coupled to the second local power supply and configured to deliver respective direct current ("DC") power signals to the third power port and the fourth power port;
a composite power-data cabling connection coupled between the first power port and the first data port of the first power sourcing equipment device and the third power port and the third data port of the second power sourcing equipment device;
at least first through third splice enclosures coupled in series along the composite power-data cabling connection;
a first remote distribution node coupled between the first splice enclosure and a first remote powered device, wherein a power tap port and a data tap port of the first splice enclosure are coupled to a power input port and a data input port of the first remote distribution node, respectively, and wherein the first remote powered device is coupled to a local power port and a local data port of the first remote distribution node;
a second remote distribution node coupled between the second splice enclosure and a second remote powered device, wherein a power tap port and a data tap port of the second splice enclosure are coupled to a power input port and a data input port of the second remote distribution node, respectively, and wherein the second remote powered device is coupled to a local power port and a local data port of the second remote distribution node.

13. The power and data connectivity micro grid of claim 12, wherein a power tap port and a data tap port of the third splice enclosure are not coupled to any powered telecommunication equipment.

14. The power and data connectivity micro grid of claim 13, wherein the third splice enclosure is coupled between the first splice enclosure and the second splice enclosure along the composite power-data cabling connection.

15. The power and data connectivity micro grid of claim 12, further comprising a second composite power-data cabling connection that extends between the second power port and the second data port of the first power sourcing equipment device and a fourth splice enclosure, the second composite power-data cabling connection extending adjacent the first composite power-data cabling connection at least between the first power sourcing equipment device and the first splice enclosure.

16. A method of providing power and data connectivity, the method comprising:
deploying a power and data connectivity micro grid that delivers DC power to a first remote powered device and a second remote powered device of a telecommunications system, the power and data connectivity micro grid comprising:
a first power sourcing equipment device having a first power port, a second power port, a first data port and a second data port, the first power sourcing equipment device coupled to a local power supply and configured to deliver respective first and second direct current ("DC") power signals having respective first and second DC voltage levels to the first power port and the second power port;
a first remote distribution node that is electrically coupled between the first power sourcing equipment device and the first remote powered device;
a second remote distribution node that is electrically coupled between the first power sourcing equipment device and the second remote powered device;
a first composite power-data cable coupled between the first power port and the first data port of the first power sourcing equipment device and a first power port and a first data port of the first remote distribution node;
a second composite power-data cable coupled between the second power port and the second data port of the first power sourcing equipment device and a first power port and a first data port of the second remote distribution node; and
a first splice enclosure coupled along a first hybrid power-data cable between the first power sourcing equipment device and the first remote distribution node;
delivering power and data to the first remote powered device and to the second remote powered device via the power and data connectivity micro grid; and thereafter
connecting a third composite power-data cable to a power tap port of the first splice enclosure;
connecting a third remote distribution node to the third composite power-data cable;
connecting a third remote powered device to the third remote distribution node; and
providing a third DC power signal having a third DC voltage level that is less than the first DC voltage level to the first remote powered device over a portion of the first composite power-data cable and over at least a portion of the third composite power-data cable.

17. The method of claim 16, wherein the first DC voltage level exceeds 260 volts.

18. The method of claim 16, wherein the power and data connectivity micro grid further includes a second power sourcing equipment device that is coupled to the first remote distribution node via a fourth composite power-data cable.

19. The method of claim 16, wherein the first composite power-data cable comprises a power-plus-fiber cable that includes a plurality of segments, where each segment includes a plurality of optical fibers and a plurality of pairs of power conductors, and wherein some of the segments include more optical fibers than other of the segments.

20. The method of claim 16, wherein the first remote distribution node includes an associated energy storage device and a bi-directional DC-to-DC converter that is configured to charge the energy storage device if the energy storage device is not fully charged and is configured to provide power to the first remote powered device if the first remote powered device requires more power than is being output by the DC-to-DC converter.

* * * * *